US008229811B2

(12) United States Patent
Hyakutake et al.

(10) Patent No.: US 8,229,811 B2
(45) Date of Patent: *Jul. 24, 2012

(54) SYSTEM, COMPUTER PROGRAM PRODUCT AND METHOD FOR MANAGING DOCUMENTS

(75) Inventors: Shogo Hyakutake, Boonton Township, NJ (US); Hiroshi Kitada, Tuckahoe, NY (US)

(73) Assignees: Ricoh Company, Ltd., Tokyo (JP); Ricoh Americas Corporation, West Caldwell, NJ (US)

( * ) Notice: Subject to any disclaimer, the term of this patent is extended or adjusted under 35 U.S.C. 154(b) by 955 days.

This patent is subject to a terminal disclaimer.

(21) Appl. No.: 11/612,929

(22) Filed: Dec. 19, 2006

(65) Prior Publication Data
US 2007/0088640 A1    Apr. 19, 2007

Related U.S. Application Data

(62) Division of application No. 10/116,162, filed on Apr. 5, 2002, now Pat. No. 7,194,433.

(51) Int. Cl.
*G07F 19/00* (2006.01)
*H04M 15/00* (2006.01)
*G06F 3/12* (2006.01)

(52) U.S. Cl. .......................................... 705/34; 358/1.1

(58) Field of Classification Search .................. 705/1.1, 705/34; 385/1; 358/1.1
See application file for complete search history.

(56) References Cited

U.S. PATENT DOCUMENTS

| | | | | |
|---|---|---|---|---|
| 5,561,709 A | * | 10/1996 | Remillard | 379/93.19 |
| 5,913,019 A | * | 6/1999 | Attenberg | 358/1.18 |
| 6,009,442 A | | 12/1999 | Chen et al. | |
| 6,063,030 A | * | 5/2000 | Vara et al. | 600/437 |
| 6,112,239 A | | 8/2000 | Kenner et al. | |
| 6,147,769 A | * | 11/2000 | Jackson et al. | 358/1.18 |
| 6,262,732 B1 | | 7/2001 | Coleman et al. | |
| 6,452,692 B1 | * | 9/2002 | Yacoub | 358/1.15 |

(Continued)

FOREIGN PATENT DOCUMENTS

JP   2000-353172   12/2000

(Continued)

OTHER PUBLICATIONS

Richard M Adams II, and Joshua B Weisberg. "Software for applying color management profiles." GATFWORLD Sep. 1, 1998: ProQuest Central, ProQuest. Web. Apr. 17, 2012.*

(Continued)

*Primary Examiner* — Russell S. Glass
*Assistant Examiner* — Seye Iwarere
(74) *Attorney, Agent, or Firm* — Oblon, Spivak, McClelland, Maier & Neustadt, L.L.P.

(57) ABSTRACT

A system, method and computer program product for managing documents are disclosed. The system includes a document manger configured to receive job information from a remote user via a network, the job information being related to a job performed on a document. The document manager can generate billing information based on the job information; and transmit the billing information to an application service provider (ASP) providing a service on the document. The document manager can also transmit the information to the ASP. The document manager can receive login information from the user, and verify the login information. The document manager can generate a job profile based on the login information, and transmit the job profile to the user. The image processing apparatus used in this system, and the method performed by such an image processing apparatus, are also disclosed.

29 Claims, 19 Drawing Sheets

U.S. PATENT DOCUMENTS

| | | | |
|---|---|---|---|
| 6,468,212 B1* | 10/2002 | Scott et al. | 600/437 |
| 6,480,304 B1* | 11/2002 | Os et al. | 358/474 |
| 6,496,206 B1 | 12/2002 | Mernyk et al. | |
| 7,117,247 B2 | 10/2006 | Hyakutake et al. | |
| 7,142,690 B2 | 11/2006 | Hyakutake et al. | |
| 7,149,784 B2 | 12/2006 | Kitada et al. | |
| 7,196,805 B1* | 3/2007 | Toebes et al. | 358/1.15 |
| 2002/0027673 A1* | 3/2002 | Roosen et al. | 358/1.13 |
| 2002/0138620 A1* | 9/2002 | Brown | 709/227 |
| 2002/0156801 A1 | 10/2002 | Kitada et al. | |
| 2003/0103234 A1* | 6/2003 | Takabayashi et al. | 358/1.15 |
| 2005/0019077 A1* | 1/2005 | Hatta et al. | 400/62 |
| 2005/0036157 A1* | 2/2005 | Takabayashi et al. | 358/1.9 |
| 2005/0207730 A1* | 9/2005 | Iwamura | 386/46 |
| 2005/0231760 A1* | 10/2005 | Minato | 358/1.15 |
| 2005/0246272 A1 | 11/2005 | Kitada et al. | |
| 2006/0082805 A1* | 4/2006 | Kobayashi et al. | 358/1.14 |
| 2006/0092445 A1* | 5/2006 | Muramatsu | 358/1.9 |
| 2006/0146358 A1* | 7/2006 | Sattler et al. | 358/1.14 |
| 2006/0168075 A1 | 7/2006 | Kitada et al. | |
| 2006/0168148 A1 | 7/2006 | Hyakutake et al. | |
| 2006/0259566 A1 | 11/2006 | Hyakutake et al. | |
| 2006/0269099 A1 | 11/2006 | Hyakutake et al. | |
| 2007/0030506 A1* | 2/2007 | Takabayashi et al. | 358/1.9 |
| 2007/0030999 A1 | 2/2007 | Hyakutake et al. | |
| 2007/0127051 A1* | 6/2007 | Sakayama et al. | 358/1.14 |
| 2007/0127053 A1* | 6/2007 | Tominaga | 358/1.14 |
| 2008/0094655 A1* | 4/2008 | Nagai | 358/1.15 |
| 2008/0291283 A1* | 11/2008 | Achiwa et al. | 348/207.2 |

FOREIGN PATENT DOCUMENTS

| | | |
|---|---|---|
| JP | 2002354142 A | 5/2001 |
| JP | 2001-306315 | 11/2001 |
| JP | 2002-56304 | 2/2002 |

OTHER PUBLICATIONS

U.S. Appl. No. 09/684,965, filed Oct. 10, 2000, Uchida, et al.
U.S. Appl. No. 09/795,438, filed Mar. 1, 2001, Hyakutake, et al.
U.S. Appl. No. 11/545,492, filed Oct. 11, 2006, Uchida, et al.
U.S. Appl. No. 11/612,943, filed Dec. 19, 2006, Hyakutake, et al.
U.S. Appl. No. 11/675,774, filed Feb. 16, 2007, Hyakutake, et al.
U.S. Appl. No. 11/675,779, filed Feb. 16, 2007, Hyakutake, et al.
U.S. Appl. No. 11/675,125, filed Feb. 15, 2007, Uchida, et al.
Xerox's FlowPort—Manage Your Documents Efficiently without a PC, John Pauschert, Nov. 8, 2001.
Xerox FlowPort Jun. 2000; www.xeroxuae.com/pdf/flowport.pdf, Jun. 2000; Xerox; 4 pages.

* cited by examiner

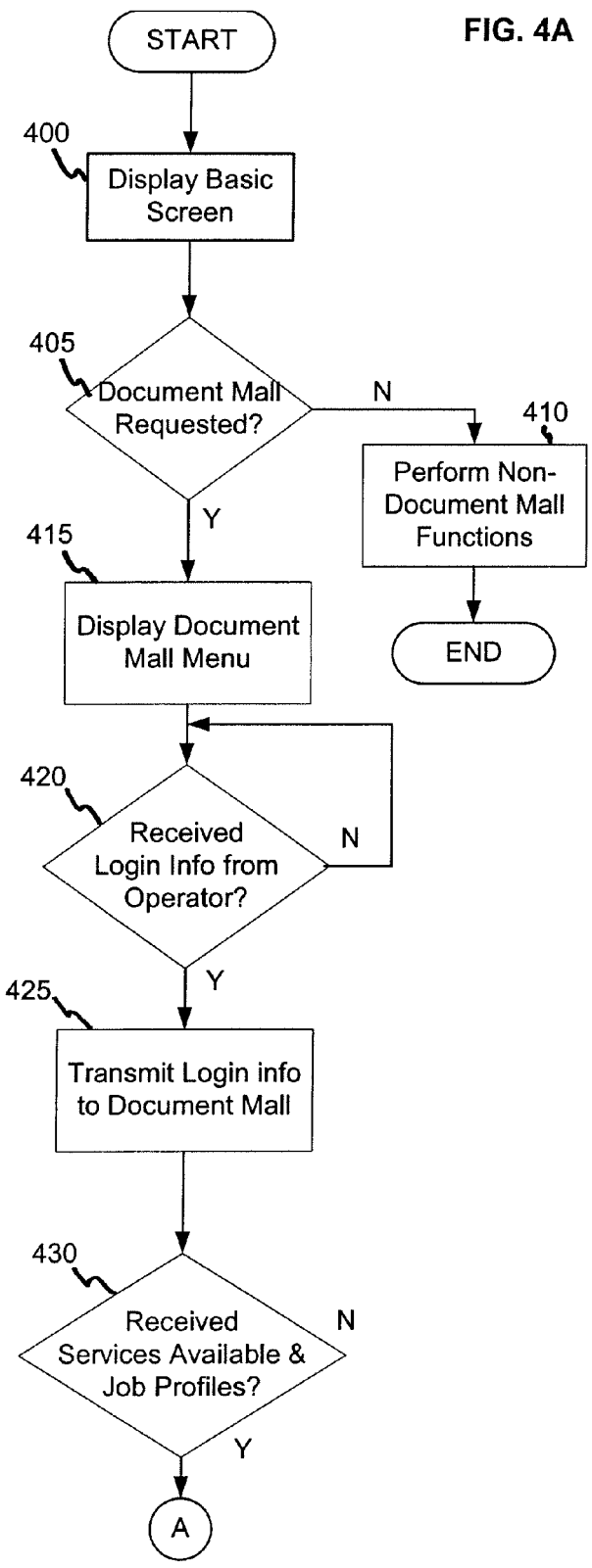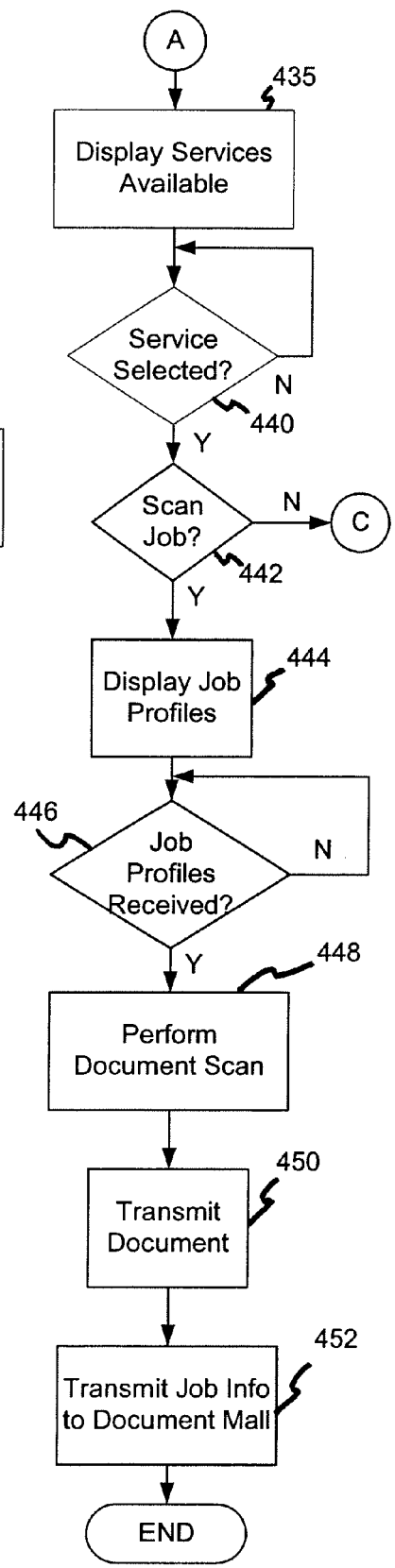
FIG. 4A

Scan Profile Selection screen

| Scan Profiles | Archive Profiles | Print & Delivery Profile |
|---|---|---|
| Destination folder | Archive name | Document type |
| Scan resolution (e.g., 200, 400, 600, 1200 d.p.i.) | Archive status: "On line," i.e., directly and easily accessible, such as on a Web site. "Off line," i.e., stored in an external medium. "Near line," stored in a medium accessible via a computer network (a juke box" system). | Print service type |
| Color / Black & White | Color / Black & White | Delivery option |
| Compression method | Compression method (e.g., Bitmap, PDF, JPEG, JPEG2000) | Finishing options |
| Auto title | Auto title (performed for example with OCR software) | |
| Auto rotation | Auto rotation (performed for example with OCR software) | |
| Image density (e.g., fine, normal, economy) | Auto Index (performed for example with OCR software) | |
| Document source (ADF or platen) | Disaster recovery (this parameter designates a storage location for disaster recovery) | |
| Paper size | Create paper copy | |
| Duplex | Create optical copy | |
| Scan Mode (e.g., Text, Gray, Scale, Photo, Text&Photo) | | |
| Media type | | |
| Mixed size original | | |
| OCR | | |
| PDF conversion | | |
| Post scan workflow | | |

FIG. 18

| Job Log for Scan Profiles | Job Log for Archive Profiles | Job Log for Print & Delivery Profile |
|---|---|---|
| Serial No:<br>Example: "H123456789" | Serial No:<br>Example: "H123456789" | Serial No:<br>Example: "H123456789" |
| Account:<br>Document Mall Account:<br>Example: "Ricohweb" | Account:<br>Document Mall Account:<br>Example: "Ricohweb" | Account:<br>Document Mall Account:<br>Example: "Ricohweb" |
| User name:<br>Document mall user name:<br>Example: "Jones" | User name:<br>Document mall user name:<br>Example: "Jones" | User name:<br>Document mall user name:<br>Example: "Jones" |
| Date & time stamp<br>1/1/02 12:00 PM | Date & time stamp<br>1/1/02 12:00 PM | Date & time stamp<br>1/1/02 12:00 PM |
| Profile used<br>Scan profile | Profile used<br>Archive profile | Profile used<br>Print & Delivery profile |
| Document name | Document name | Document name |
| Number of pages uploaded | Number of pages uploaded | Number of pages printed |
| Document paper size | Document paper size | Document paper size |
| Resolution:<br>scanning resolution | Resolution:<br>scanning resolution | Resolution:<br>scanning resolution |
| Scan mode | Scan mode | Number of copies printed |
| Color/B&W | Color/B&W | Color/B&W |
| Duplex | Duplex | Duplex |
| Media type | Media type | Media type |
| Size of document uploaded | Size of document uploaded | Staple option |
| Time elapsed for upload | Time elapsed for upload | delivery address ID |
| Status: done/error | Status: done/error | Status: done/error |

FIG. 19

| Billing Parameters for Scan Profiles | Billing Parameters for Archive Profiles | Billing Parameters for Print & Delivery Profile |
|---|---|---|
| Number of pages scanned | File size | Document type |
| Scanning resolution | Archive media type | Print service type |
| Scan Mode | On line / Near line / Off line | Finishing service type |
| Color / B&W | Duplicate copy | Delivery address ID |
| Duplex | Off-site copy | Number of pages printed |
| Media type | Disaster recovery option (provide at least one off-site archiving for the document concurrently by the ASP) | number of copies printed |
| File size | | paper size |
| Scanning time | | resolution |
| | | color / B&W |
| | | Duplex |
| | | Media type |
| | | staples |

Fig. 20

| Charge Matrix | | |
|---|---|---|
| Per Page Unit Cost | | |
| Duplex | Yes | $ 0.10 |
| | | |
| Staple | Yes | 0.25 (Per Copies) |
| | | |
| Resolution | 300 dpi | $ 0.05 |
| | 400 dpi | $ 0.07 |
| | 600 dpi | $ 0.08 |
| | | |
| Paper Size | Letter | $ 0.05 |
| | Legal | $ 0.06 |
| | Tabloid | $ 0.07 |
| | | |
| Compression Method | JPEG | $ 0.20 |
| | MMR | $ 0.10 |
| | MH | $ 0.10 |
| | | |
| PDF Conversion | PDF | $ 0.10 |
| | | |
| Scan Mode/Color | Color | $ 0.30 |
| | Gray Scale | $ 0.20 |
| | Black & White | $ 0.10 |

Fig. 21A

| Per Job Unit Cost | | |
|---|---|---|
| Document Type | Credit Report | $ 5.00 |
| | Patent | $ 3.00 |
| | | |
| | | |
| Delivery | Next Day | $ 20.00 |
| | Second Day | $ 10.00 |
| | Ground | $ 5.00 |

Fig. 21B

| Job Profile Name | | Scanning Resolution | Paper Size | Destination | Compression Method | PDF Conversion | Scan Mode | Number of pages | Total Job Cost by ASP |
|---|---|---|---|---|---|---|---|---|---|
| Scan Profile 1 | Selected Parameter | 300 dpi | Letter | My Job | JPEG | Yes | Color | 100 | |
| | Price per page | $ 0.05 | $ 0.05 | | $ 0.20 | $ 0.10 | $ 0.30 | | $ 70.00 |
| Scan Profile 2 | Selected Parameter | 600 dpi | Tabloid | Miscellaneous | MMR | No | Gray Scale | 100 | |
| | Price per page | $ 0.08 | $ 0.07 | | $ 0.10 | $ 0.00 | $ 0.20 | | $ 45.00 |

Fig. 22A

| Job Profile Name | | Document Type | Paper Size | Color | Duplex | Staple | Number of Pages | Number of Copies | Delivery Option | Total Job Cost by ASP |
|---|---|---|---|---|---|---|---|---|---|---|
| Print & Delivery 1 | Selected Parameter | Patent | Letter | B&W | No | Yes | 20 | 3 | No | |
| | Price per Unit | $3.00 (Per Document) | $ 0.05 | $ 0.10 | $ 0.00 | $ 0.25 Per Copy) | $15.00 | | | $48.75 |
| Print & Delivery 2 | Selected Parameter | Credit Report | Letter | B&W | Yes | No | 100 | 1 | Second Day | |
| | Price per Unit | $5.00 (Per Document) | $ 0.05 | $ 0.10 | $ 0.10 | $ 0.00 | $ 25.00 | | $ 10.00 | $ 40.00 |

Fig. 22B

SYSTEM, COMPUTER PROGRAM PRODUCT AND METHOD FOR MANAGING DOCUMENTS

CROSS-REFERENCE TO RELATED APPLICATIONS

This application is a Divisional of and claims the benefit of priority from U.S. application Ser. No. 10/116,162 filed Apr. 5, 2002. The entire contents of each of the above application are incorporated herein by reference.

BACKGROUND OF THE INVENTION

1. Field of the Invention

The present invention is directed to methods, computer-based systems and computer program products for managing documents, in particular documents stored to, or retrieved from, application service providers.

2. Discussion of the Background

A system for storing and retrieving documents to and from application service providers (ASPs) is disclosed in co-pending application Ser. No. 09/684,965, the entire content of which is hereby incorporated by reference. As explained in that document, an ASP is an entity, typically a company, that offers users (individual customers, companies, corporations, organizations, etc. . . . ) access over a network, such as the Internet, to applications and related services would otherwise have to be located on the user's local computer. For example, ASPs can provide searchable databases of legal, medical, financial, educational, scientific, or marketing documents. In this system for managing documents, a computer based document manager is connected to users (including for example multi function product "MFPs", e.g., printers, scanners, digital copiers, fax machines, or digital cameras) via a network (e.g., the Internet) and to ASPs via a network (e.g., the Internet).

The document manager is configured to receive data from a user, receive data from an ASP based on the user input, transform the received data in some desired way, and output the transformed data stream to the user. The data sent by the user to the document manager can include a document, a request to transfer a document from the user to an ASP, and/or a request to retrieve a document from an ASP. The data sent by the ASP to the document manager can include a document, a URL, and/or billing information.

For example, the document manager allows a user to store a document at the ASP. The document manager may be in a partnership with the ASPs to provide storage at the ASPs for documents of users, i.e. customers of the document manager. For instance, a user may decide to store sensitive legal documents, insurance contracts, or digital certificates on a local storage device for a predetermined period of time, and have the documents protected from loss, theft, fire, disaster, etc. . . . by storing them at an ASP, which may provide better protection for the secured documents. In this case, the user benefits from the ASP's know-how for handling and protecting secured documents. The ASP can charge a fee for the storage. The document manager can include this fee with other fees (e.g., from other ASPs) in a unified bill for the benefit of the user.

Such a network-based document management system, also referred to as a "Document Mall," gives its users secure access to their documents and files from anywhere on the network, from anywhere in the world when the network is the Internet. The system enables users to collaborate with colleagues and share documents around the corner or around the globe.

The co-pending patent application Ser. No. 09/795,438 discloses an image forming apparatus providing user-interfaces to permit an operator to conveniently interact with ASPs and with a document manager, such as those disclosed in previously mentioned Ser. No. 09/684,965, the entire content of application Ser. No. 09/795,438 is hereby incorporated by reference. This system permits an operator to take advantage of the services offered by the document manager, such as document storage at ASPs and document retrieval from ASPs, by interacting conveniently via menus displayed on an image forming apparatus, such as an MFP. For example, the operator may request the document manager to store a document at an ASP by inputting a storage request. The MFP scans the document to be stored and sends the document to the desired storage location using a menu displayed at the MFP. The operator may also request the document manager to retrieve a document from an ASP by inputting a retrieval request and keywords to find the desired document using a menu displayed at the MFP.

The above systems provide advantages with respect to billing, e.g., by generating a unified bill from charges of different ASPs. These systems, however, do not provide much flexibility in terms of how the charges are computed. In these systems, the ASPs might charge the document manager a fixed flat fee for their services, and the document manager may charge its users a fixed flat fee for its services. Such procedures create little incentive for the document manager to promote the use of a particular ASP among its existing clients, nor does it create much intra-network competition among already affiliated ASPs. Such procedures do not provide ASPs with much information about their users, such as their needs and habits. The ASPs therefore cannot use such information to improve their services, nor to effectively market their services.

A number of conventional Internet services, providing web services and web contents, are based on a charge per connection time. Another method of charging is based on the transmission data amount, such as packet specific charge in wireless cellular telephone systems. These conventional billing systems, however, are not ideal for a document management service in part because they cannot take into account the services related to the processing of the documents. Another billing method includes manually inputting job information into a computer to generate billing information. This manual method, however, is burdensome, inefficient and prone to errors.

SUMMARY OF THE INVENTION

Accordingly, one object of the present invention is to solve the above-noted problems and improve upon the noted inefficiencies.

Another object of the present invention is to provide a system, a method, and a computer program product for managing documents, which provides information about the customer's use of the system.

To achieve these and other objects, the present invention provides a computer based system wherein a document manager receives data from the user and transmits data to the ASPs. In particular, the document manager receives job information from an MFP relating to a job performed by the MFP on a document (e.g., scanning, printing). The document manager can generate and transmit billing information to the ASP based on this job information and/or transmit the job information to the ASP. The ASP can generate a bill and consider the information received from the document manager to improve services, develop new services, and market their services.

BRIEF DESCRIPTION OF THE DRAWINGS

FIGS. 4A-B show a flowchart for a method of managing documents implemented by a user/image forming apparatus according to one embodiment of the present invention.

FIG. 18 shows examples of job profiles according to one embodiment of the present invention.

FIG. 19 shows examples of log jobs maintained by a document manager according to one embodiment of the present invention.

FIG. 20 shows examples of billing parameters used to generate charges according to one embodiment of the present invention.

FIGS. 21A-B show charge matrices for generating charges based on job profiles according to one embodiment of the present invention.

FIGS. 22A-B show charge matrices for generating charges based on job parameters according to one embodiment of the present invention.

DESCRIPTION OF THE PREFERRED EMBODIMENTS

Figure 1:
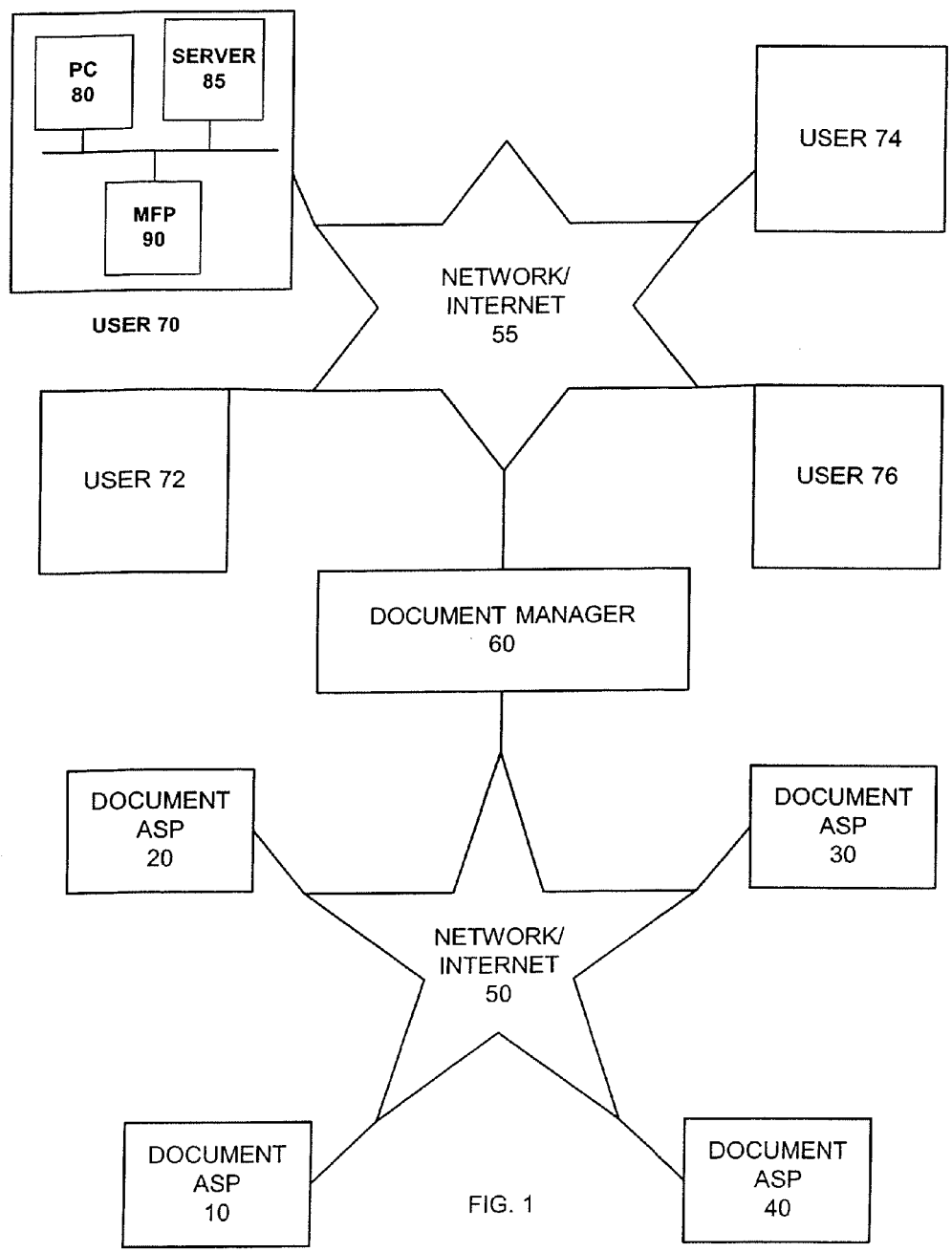
FIG. 1 is a block diagram showing an overall system configuration according to one embodiment of the present invention.

Referring now to the drawings, wherein like reference numerals designate identical or corresponding parts throughout the several views, FIG. 1 is a block diagram illustrating a system for managing documents according to the present invention. The system includes a network 50 that interconnects at least one, but preferably a plurality of ASPs 10-40, a document manager 60, and at least one user 70, but preferably a plurality of users 70, 72, 74 and 76 connected to the document manager 60 via a network 55. The users 70, 72, 74 and 76 are thus remote users with respect to the document manager 60. The networks 50 and 55 are preferably the Internet, but can also be a local area network, a wide area network, any type of network such as an intranet, an extranet, or a combination thereof. An extranet may be used to provide controlled access to external users, for example through the Internet. How the users 70 and the document manager 60 can be connected to the Internet 50 and 55 is well-known in the art and is explained for example, in part 38 of "How Computers Work", by Ron White, Que Corporation, pps. 340-349, September, 1999, ISBN: 0-7897-2112-0, the entire content of this book being hereby incorporated by reference. Other communications links for the networks 50 and 55, such as a virtual private network, or a wireless link, may be used as well.

As shown in FIG. 1, the user 70 (and similarly users 72, 74 and 76) includes an image processing apparatus 90, such as multi-function printer (MFP), connected to the network 55. The image processing apparatus can be either directly connected to the network 55 or via another device such as a computer. The user 70 (and similarly users 72, 74 and 76) can also include a PC 80, a server 85 which can provide access to a group ware database (not shown), a printer, a local storage device, a medium drive, or a combination of such devices. The users 70, 72, 74 and 76 can also include other multifunction devices such as the Ricoh eCabinet™.

As shown in FIG. 1, the user 70 (and similarly users 72, 74 and 76) can interact (exchange data) with the document manager 60 via the network/Internet 55, so as to benefit from a number of services provided by the document manager 60, which are described in detail in Ser. No. 09/684,965, the entire content of which is hereby incorporated by reference. For example, the user 70 can provide the document manager 60 with a request for storing at an ASP 10 a document scanned by the MFP 90, as described in detail in Ser. No. 09/795,438, the entire content of which is hereby incorporated by reference. In a preferred embodiment of the present invention, the remote user 70 can provide the document manager 60 with job information related to a job performed on a document by the image processing apparatus included in the remote user.

For example, the remote user 70 can transmit to the document manager 60 job information such as the number of pages scanned or printed, the number of documents scanned or printed, the scanning/printing resolution (e.g., 200, 400, 600, 1200 dot per inch), the scan/print mode (Text, Gray, Scale, Photo, Text&Photo), the size of the paper for the document, the color selection (selected by the operator and/or automatically selected by the MFP 90), the compression ratio of the image data (e.g., fine, normal, economy), the image data format, i.e., the compression method of the image data (e.g., Bitmap, PDF, JPEG, JPEG2000). Using this job information, the document manager 60 can update a job log for that user. The document manager 60 can generate billing information based on the job performed. The user 70 can also provide the document manager 60 with other information such as user I.D.s, passwords, the name of the person scanning or printing the document, the name of the author of the document, the date and time of the scanning or printing, the version of the document, the serial number, model name and/or location of the image processing apparatus 90 of the user 70.

Figure 2:
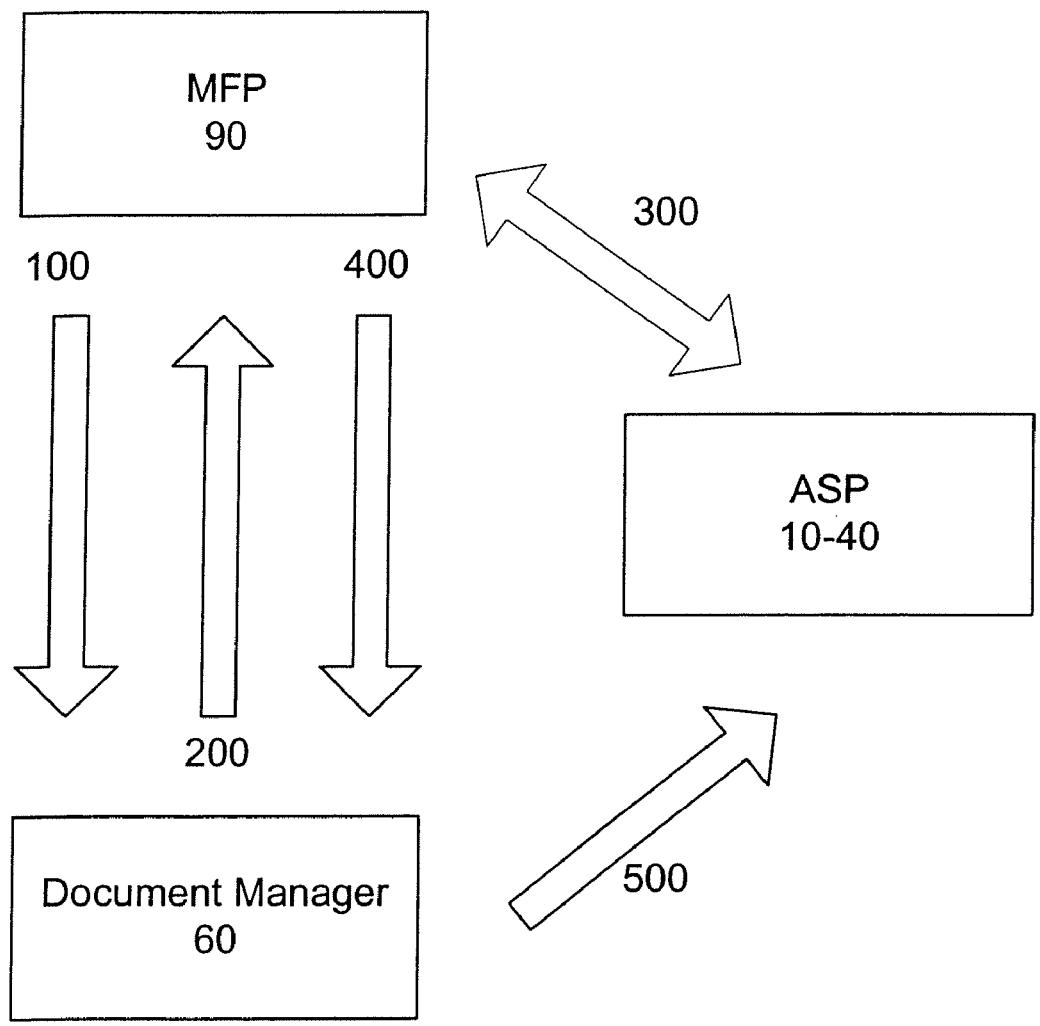
FIG. 2 is a block diagram illustrating the functional relationship between various elements according to one embodiment of the present invention.

FIG. 2 is a block diagram illustrating the functional relationship between an MFP 90, a document management 60 and ASPs 10-40 according to one embodiment of the present invention. While FIG. 2 shows an MFP as the device 90, any other image processing device can be used for the present invention. As shown in the embodiment of FIG. 2, the MFP 90 can send to the document manager 60 user login information in a first transmission 100. For example, the operator of the MFP 90 can enter a username, a password, an ID number, and/or account information into the MFP 90 using its control panel.

An example of a control panel compatible with the present invention is described in detail in Ser. No. 09/795,438, the entire content of which is hereby incorporated by reference. In that document, the control panel includes interactive menus displayed on a display screen of the MFP 90 permitting an operator of the MFP 90 to interact with the document manager (also referred to as the "Document Mall"). The control panel of the MFP 90 can include a display using functions such as basic HTTP or FTP. For example, the display can use a Web browser program. The operator can also select an affiliate ASP 10 using a menu displayed on the MFP 90 control panel. The selected ASP 10 can be part of the login information. The MFP 90 can also transmit to the document manager 60 as part of the login information the MFP's serial number, location, and/or model name.

Figure 11:
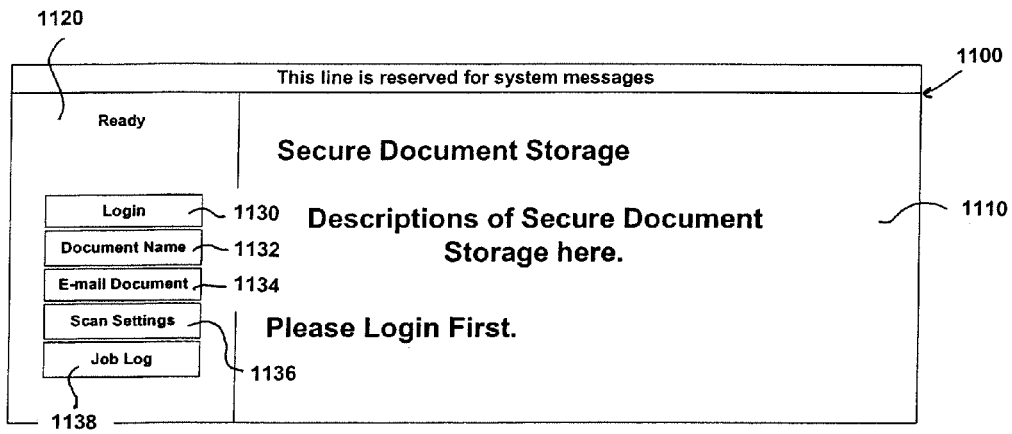
FIGS. 11-17 are illustrations of screens displayed on an image forming apparatus according to one embodiment of the present invention.
Figure 12:
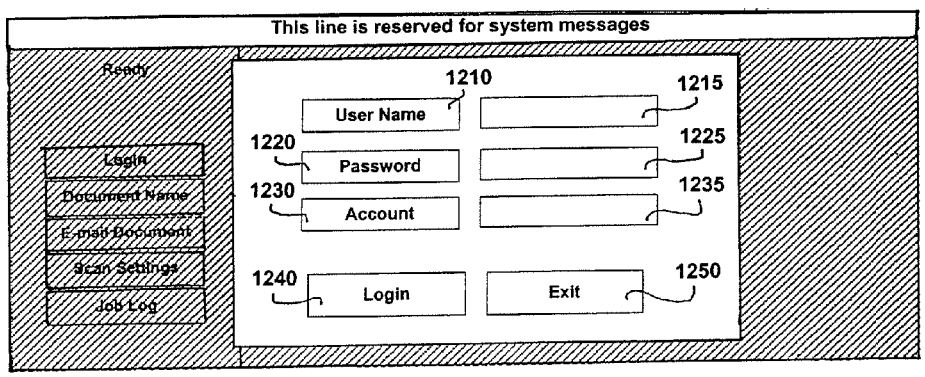

Two specific, non-limiting examples of display screens are shown in FIGS. 11-12. FIG. 11 shows an initial display screen 1100 with a field 1110 on which the MFP 90 can display text and graphics, such as information, instructions, advertisement, promotions, etc. The text lines shown in the field 1110 can be touch sensitive function keys that allow an operator to select certain operations. A field 1120 displays five touch sensitive function keys 1130-8, which include a login function key 1130. If the operator of the MFP 90 touches function key 1130, the MFP 90 displays a display screen 1200 shown in FIG. 12. Alternatively, the operator may touch function keys 1132-6 to scan and e-mail a document, or key 1138 to display the job log of MFP 90.

Using display screen 1200, the operator can select to enter his user name, a password, an account number. For example, the operator can enter his user name, a password, an account number using the text-input fields 1215, 1225 and 1235, respectively. The text-input fields 1215, 1225 and 1235 can be activated by touching the function key 1130. Alternatively, the text-input fields 1215, 1225 and 1235 can be activated by touching the function keys 1210, 1220 and 1230, respectively. After touching each of these touch keys, the MFP 90 displays a touch panel keyboard (not shown) so that the operator can enter individual letters and characters. Once the operator has entered this information, he can touch the function key 1240 to login with the document manager 60. Alternatively, the operator may chose to exit at any time by touching the function key 1250.

The document manager 60 can verify the user login information to ensure that the operator is authorized to use the system. For example, the document manager 60 can compare the user login information against data stored on a database maintained on the document manager 60. After verification, the document manager 60 can connect the MFP 90 to an affiliate ASP 10, or can transmit a list of ASPs available for that authorized operator, generated based on the operator's login information. The document manager 60 may also select a list of services and job profiles available (further discussed below) for that operator. As shown in FIG. 2, the document manager 60 can transmit the verification results, the connection results, and/or the selected list of services and job profiles to the MFP 90 in a second transmission 200. The MFP 90 can display the list of available services and job profiles, for example using screen 1300 shown in FIG. 13. This display screen 1300 prompts the operator of the MFP 90 to select among the services available. For example, the services available can include but are not limited to:

Secure Scan to Web
Document Archiving
Document Print & Delivery

Figure 13:
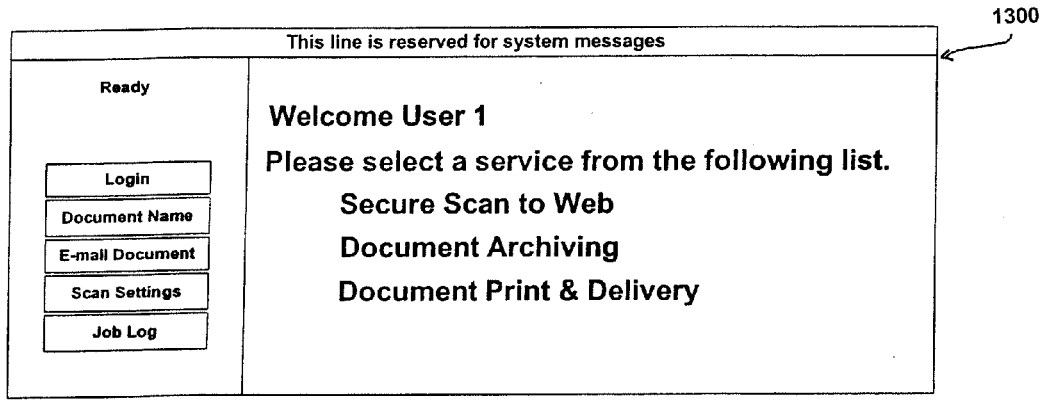

In FIG. 13, the text lines "Secure Scan to Web," "Document Archiving," and "Document Print & Delivery" can be touch sensitive function keys that the operator can touch to select a certain service. After selecting one of these options, the MFP 90 can display on screen 1300 the list of ASPs available for that authorized operator. The operator can then select one of these ASPs, for example by touching the screen where the ASP to be selected is displayed.

The "Secure Scan to Web" service permits the operator of the MFP 90 to scan a document and securely store the document at an ASP 1040. This service provides storage of documents at a location that is relatively easy to access. For example, the document can be stored "on site," e.g., on the hard drive disk of the ASP's Web site. Under this service, the operator can readily access the document, for example after a simple password verification.

The "Document Archiving" service permits the operator of the MFP 90 to scan a document and securely archive the document at an ASP 10-40. This service provides storage of documents at a remote location, or "off-site, for example on a CD-R, or a DVD+RW in a disk changer mechanism on the ASP's Web site. This option is well suited for documents that need to be archived, but that are not frequently, or repeatedly accessed.

The "Document Print & Delivery" service permits the operator of the MFP 90 to search for a document, for example within a company's central document repository. Under this service, the operator may request to have the document downloaded to the MFP 90 for viewing and/or printing. Alternatively, the operator may request to have the document printed by the ASP, or its agents, professionally finished (optional) and delivered to the operator.

Figure 14:
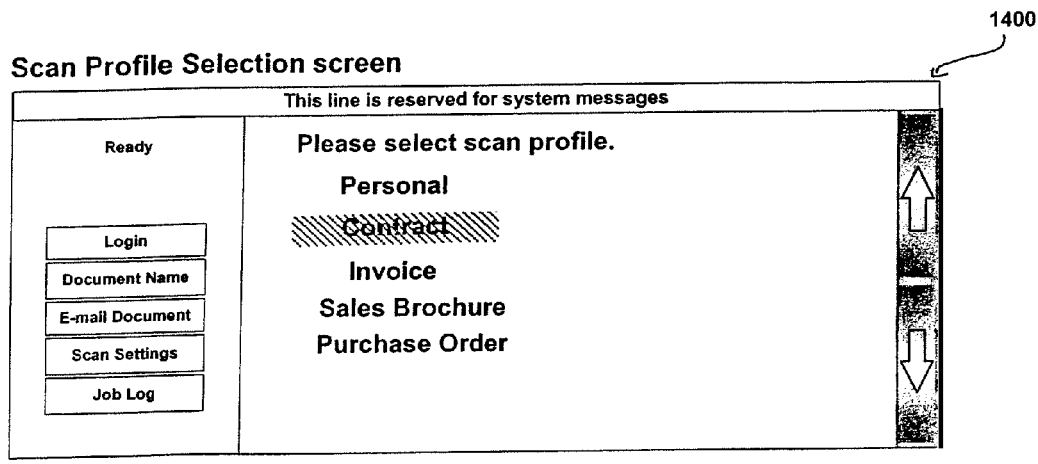

After the operator selects one of the listed services, the MFP 90 can display a screen with a selection of job profiles on the control panel. FIG. 14 shows an example of a touch sensitive display screen 1400 that displays a list of job profiles for the secure scanning service. The operator of the MFP 90 can select one of these scanning job profiles based on the operator's needs. The selection can be performed by touching one of the text lines displayed on the screen 1400.

Figure 15:
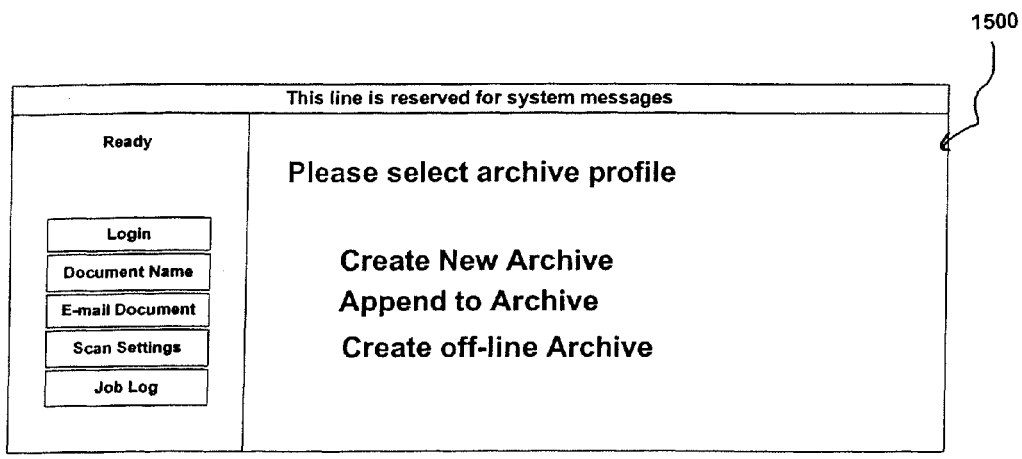

Similarly, FIG. 15 shows an example of a touch sensitive display screen 1500 that displays a list of job profiles for the archiving service. The operator of the MFP 90 can select one of these archiving job profiles, as appropriate. Again, the selection can be performed by touching one of the text lines displayed on the screen 1500.

Figure 16:
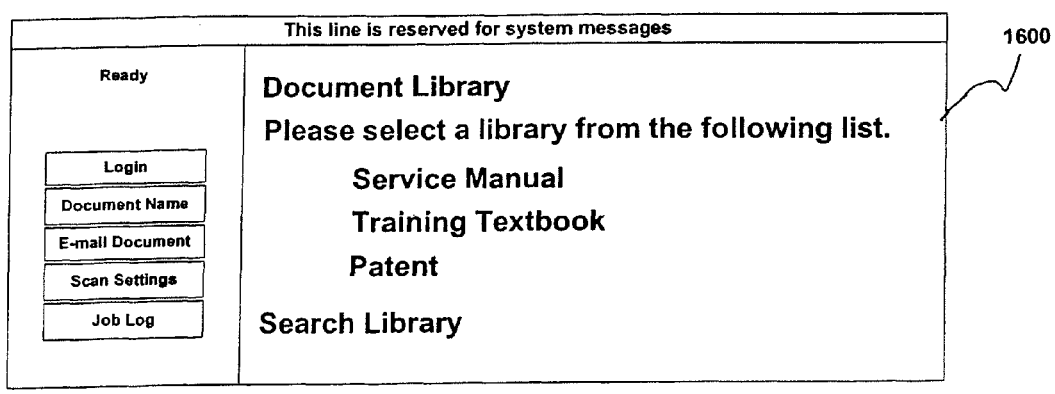

FIG. 16 shows an example of a touch sensitive display screen 1600 for the document Print & Delivery service. The display screen 1600 displays a list of libraries available to the user and from which the user can download or request a document. The operator may also search for a library not listed on the display screen 1600. Other examples of display screens for the document Print & Delivery service include screens that permit the operator to input search criteria for the document to be printed and delivered. Examples of search criteria are document name, author name, key-words, date of creation of the document, etc.

Figure 17:
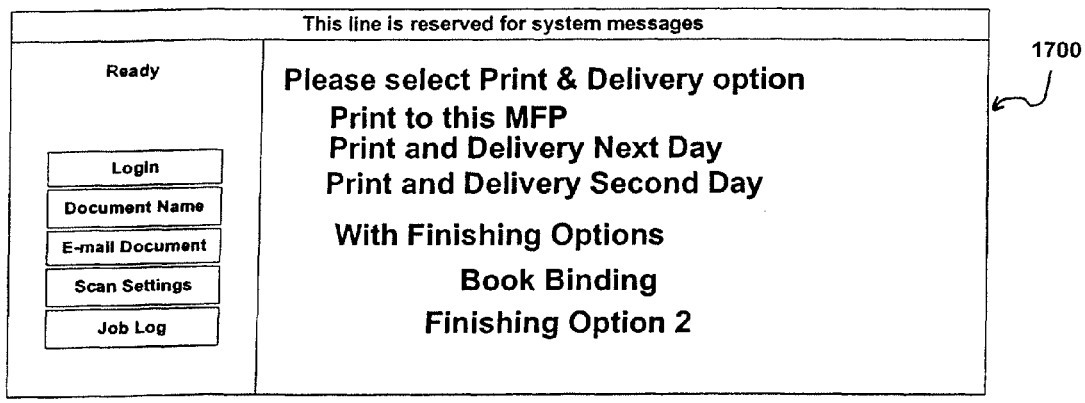

The Print & Delivery service is especially advantageous for purchasing documents or web contents over the Internet. For example, the operator can search and download or print patents, credit history information, online novels, etc. FIG. 17 shows another example of a touch sensitive display screen 1700 for the document Print and Delivery service. The display screen 1700 displays a list of Print & Delivery options available to the operator of the MFP 90. As shown in FIG. 17, the operator may select to have the document printed directly by the MFP 90, or have the document printed by the ASP (or its agent) and delivered. The operator can select a delivery schedule (e.g., first or second day delivery) available to the operator of the MFP 90. The operator can also select a finishing option, e.g., a book binding, a professional finish, or other options.

As shown in FIGS. 11-17, the MFP 90 can reserve a portion of the display screens (e.g. a top portion) to display system messages. For example, the system message can include system maintenance notices, error messages for the system, general information from the document manager 60, news and information about the document manager 60, not necessarily specific to any ASPs.

After the operator of the MFP 90 selects a job profile from one of the display screens 1400-1700, the MFP 90 sets its parameter to perform the job in accordance with the job profile. If the job to be performed includes the scanning of a document by the MFP 90, the MFP 90 can transmit the scanned document(s) to the ASP 10 in a third transmission 300 (FIG. 2). If the job to be performed includes requesting downloading a document or retrieving a document for printing, the MFP 90 can transmit the information necessary to locate the document in the third transmission 300. Alternatively, the transmission 300 of the documents can be performed either via the document manager 60 or directly to the ASP 10.

The MFP 90 can transmit the job information related to a job performed to the document manager 60 in a fourth transmission 400 (FIG. 2). As mentioned above, the job information can include for example the number of pages scanned or printed, the number of documents scanned or printed, the scanning/printing resolution, the size of paper for the document, the color selection, the compression ratio of the image data, the image data format. Using this job information, the document manager 60 can update a job log (further discussed below) and can generate billing information based on charge rates. The charge rates can be contractually pre-defined by the document manager 60 and the individual ASPs 1040 and can be a function of the selected job profile used for the job. In other words, the document manager 60 can generate billing information based on the actual use of the MFP 90 by its operator. Advantageously, the ASPs 10-40 need not spend their resources on user verification nor on the generation of the billing information as a function of the job performed at the MFP 90. The document manager 60 can be in charge of these functions, so that the ASPs can efficiently focus on providing their respective services.

As an example, the document manager 60 can use a look-up table to compute the billing information as a function of the number of pages scanned or printed by the MFP 90, or as a function of the scanning or printing resolution. Any of the parameters transmitted by the MFP 90 as part of the job information can be used to generate the billing information. The document manager 60 can also customize the billing information to the operator of the MFP 90. The document manager 60 can transmit the billing information and/or the job information to the ASP 10 in a fifth transmission 500 (FIG. 2). Alternatively, if the image processing device 90 is not directly connected to the network 55 but is connected to the network 55 via a computer, the transmissions 100, 200 and 400 can take place between the computer and the document manager 60.

As mentioned above, the document manager 60 can select a list of job profiles for the convenience of that operator. A job profile sets some or all of the parameters of the MFP 90 for a particular job and/or for a particular user and/or for a particular ASP 10. The document manager 60 can customize the job profiles to match a customer's characteristics. For example, the document manager 60 can select appropriate job profiles based on the capability of the MFP 90, which is determined by the model name of the MFP 90. The document manager 60 can determine whether there is any restricted activities based on the serial number of the MFP 90. Account information from the MFP 90 can be used to determine which job profiles are available for a particular account. The user name entered by the operator and sent to the document manager 60 can be used to determine if the operator is authorized to use a particular job profile. The job profiles for the three exemplary services mentioned above can include the information shown in FIG. 18. Advantageously, the operator of the MFP 90 can edit some or all parameters of the job profile via the MFP's control panel.

As mentioned above, the document manager 60 can update a job log based on the job information received from the MFP 90. A job log is a log that keeps information on the job(s) performed by the MFP 90. Examples of log jobs maintained by the document manager 60 are shown in FIG. 19. As mentioned above, the document manager 60 can use the job information to generate billing information based on charge rates. For example, the document manager 60 can calculate job related charges based on the parameters shown in FIG. 20.

The document manager 60 can also determine process charges based on the selected job profile. These process charges are for process jobs performed by the document manager 60 or by the ASP 10, as requested by the operator of the MFP 90 when the job profile was selected. These processes can include but are not limited to OCR (optical character recognition), PDF conversion and document storage services. Based on the billing information and the process charges, the ASP 10 can generate a bill. The bill can either be sent directly to the customer or can be sent to the document manager 60. If sent to the document manager 60, the document manager 60 can add a charge for its services and a commission for the business brought to the ASP 10 and can generate a new bill for the customer and/or the ASP 10. The document manager 60 can also combine different bills from the same ASP 10, or can combine bills from different ASPs 10-40, into a single unified bill to facilitate payment by the user 70. Of course, while the above description focused on a MFPs 90 being incorporated in the user 70, any other type of document processing device can be implemented in the present invention.

FIGS. 21A-B show examples of charge matrices for generating charges based on job profiles. FIGS. 22A-B show examples of charge matrices for generating charges based on job parameters, i.e., job information. Some of the job parameters are static parameters because they remain constant during the job. The scan resolution, the destination folder, the paper size are examples of static job parameters. Other job parameters are dynamic parameters because they vary depending on the size of the job. The number of pages, the data size, the operating time are examples of dynamic parameters.

The document manager 60 can use predetermined thresholds for the job parameters to generate the billing information. For example, in this embodiment, there is no charge for a particular job parameter as long as that job parameter stays below its threshold. These thresholds can be based on the job profiles. The document manager 60 can vary the thresholds depending on contractual relationships with the ASPs 10-40. The document manager can vary the thresholds to create promotional incentives and/or discounts for customers. As another example of a method of billing provided by the present invention, the document manager 60 can set maximum charges, i.e., upper limits. For example, the document manager 60 can charge a maximum charge no matter how many documents were scanned or printed in a single job.

Alternatively, the document manager 60 can set minimum charges, i.e., lower limits. For example, the document manager 60 can charge a minimum charge no matter how few documents were scanned or printed in a single job. The document manager 60 can charge a fixed charge per job. For example, the document manager 60 can charge a fixed percentage (e.g., 1%) of the customer charge. That fixed charge can represent a commission charged to the ASPs 1040 in consideration for the services rendered by the document manager 60.

As discussed above, the ASPs 10-40 can provide storage, retrieval, printing and delivering, and/or conversion services for documents and generate a bill for the services as a function of the job information, the billing information and/or the services provided. The present invention therefore increases the flexibility in charging fees for services rendered by the ASPs 1040 and the document manager 60. In particular, the present invention allows customization of the charges as a function of the customer's use of the system. Because the document manager 60 can charge a commission for the business brought to the ASPs 1040, the present invention creates an incentive for the document manager 60 to generate more business for the ASPs 1040. Furthermore, because the ASPs 1040 can get paid by the amount of services provided, the present invention creates an incentive among the affiliate ASPs 10-40 to compete and to provide better services. In other words, the present invention creates a new kind of affiliate relationship between ASPs 10-40 and document manager 60. In this relationship, the document manager 60 can either bill the ASPs 10-40 for its services rendered or bill the users. In a preferred embodiment, the document manager 60 would bill the ASPs 10-40 for its services rendered based on a business-to-business relationship. The bills from the document manager 60 can be sent to the ASPs 10-40 electronically, e.g., over an internet transaction, or by mail.

In addition to its advantages related to billing, the present invention offers the benefit of allowing efficient collecting information about the individual customers of the ASPs 10-40, about their habits and/or needs. The job information provided by the document manager 60 to the ASPs 10-40 can be analyzed using conventional software or databases to learn more about their respective customers' use of the system. The ASPs can use that information to better understand how their customers utilize their services and what are the more popular features offered by the ASPs. That information can also be used by the ASPs 10-40 to better market their respective services. Similarly, the document manager 60 can use the job information to better understand and serve their customers.

The present invention also provides a new, more flexible means for promoting the services of the ASPs. Conventionally, ASP could advertize their services by posting a banner on a popular web site. With the present invention, ASPs can increase their customer base merely by being one of the choices available on the display screens of the MFP 90. For example, the name or logo of a particular ASP, advertising or information about an ASP, information about a promotion, can be displayed on the initial display screen 1300 shown in FIG. 13. The operator of the MFP 90 can select that ASP simply by touching the screen where the name or logo is displayed. In addition, the ASPs can advertize their services by posting an advertizement or promotion on the MFP 90's display screens. The targeted audience would be more apt at using their services than would be the audience of a web site because the MFP 90 audience is already an MFP user with the capability to access the ASPs via the document manager 60.

Figure 3:
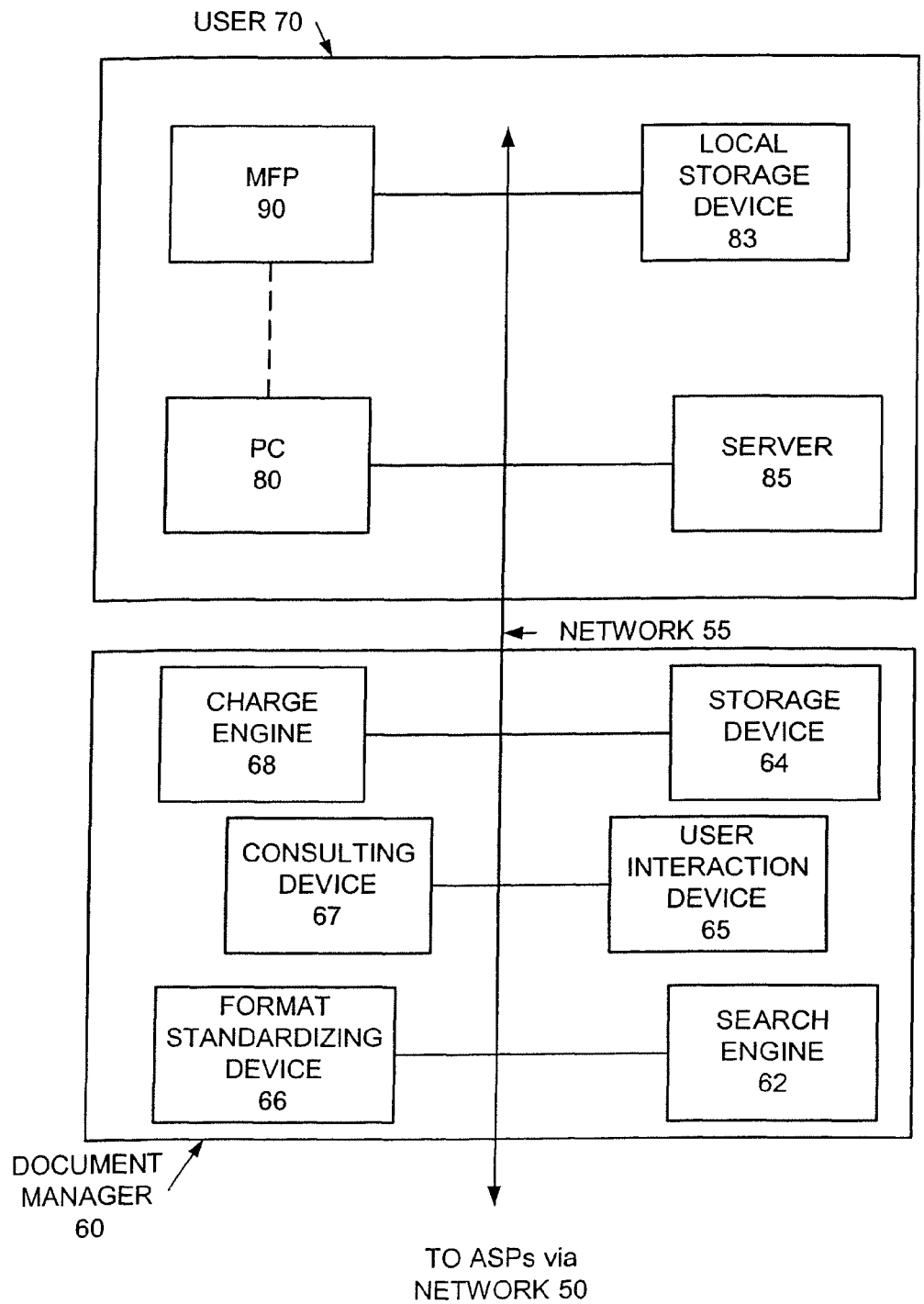
FIG. 3 is a block diagram illustrating a document manager and a user according to one embodiment of the present invention.

FIG. 3 is a block diagram illustrating the user 70 and the document manager 60 in more detail. As shown in FIG. 3, the users 70, 72, 74 and 76 can include an MFP 90, a PC 80, a local storage device 83, a server 85, or a combination of them. In the embodiment shown in FIG. 3, the user 70 can interact (exchange data) with the document manager 60 via the user interaction device 65, so as to benefit from a number of services provided by the document manager 60. In one embodiment, the user 70 can access the document manager 60 by providing login information, for example by transmitting a user-name and a password, which can be verified by user interaction device 65. For example the user interaction device 65 can verify the user's authorization by comparing the login information to information stored in a storage device 64, which can include a database. The user interaction device 65 can also receive the job information, or the electronic version of a scanned document from the user.

The storage device 64 can also store documents sent or requested by the user 70. The storage device 64 can also include job information, job profiles, the URL's of the affiliated ASPs, charge tables used to generate billing information such as those shown in FIGS. 21-22. The storage device 64 can also include threshold values, the values for commission and upper and lower charge limits, and the billing information itself. The storage device 64 can include, but is not limited to, any type of disk including floppy disks, optical disks, CD-ROM, magneto-optical disks, ROMs, RAMs, EPROMs, EEPROMs, Flash Memory, Magnetic or Optical Cards, or any type of media suitable for storing electronic instructions and/or data. Moreover, the storage device 64 may include a database, i.e., a digital repository, that may be implemented, for example, through a commercially available relational database management system (RDBMS) based on the structured query language (SQL) such as ORACLE, SYBASE, INFORMIX, or MICROSOFT ACCESS, through an object-oriented database management system (ODBMS), or through custom database management software.

The document manager 60 can also include a charge engine 68 configured to generate the billing information based on the job information, the charge tables, the thresholds, the upper, the lower limits, the commission values, etc. For example the charge engine 68 can compute billable items by multiplying the values of certain scanning parameters (part of the job information) by charges determined for each parameter as shown in FIGS. 21 and 22. After computing these billable items, the charge engine 68 can transmit the billing information to the ASP 10 and/or to the storage device 64. The charge engine 68 can also receive bills from the ASPs 1040 and generate other bills to be transmitted to the user 70. For example, the charge engine 68 can add a commission, or other billable items for services performed by the document manager 60, to a bill received from the ASPs 1040, and/or can generate a unified bill using several bills from the ASPs 10-40.

The document management 60 can also include a search engine 62 configured to search and access ASPs 10-40 based on data input from the user 70, for example via user interaction device 65. The charge engine 68 can generate a billable item for such search performed by the search engine 62. The document manager 60 can also include a format standardizing device 66 configured to standardize the formats of the documents retrieved from various ASPs 10-40. For example, the format standardizing device 66 can re-format the documents so that they may be accessed using a single GUI. The charge engine 68 can generate a billable item for such standardization performed by the format standardizing device 66.

The document manager 60 and the components thereof may be implemented using any desired structure such as a programmed general purpose computer 80, a server 85, a combination of a server with other computers, or using any desired hardware, and any desired software or firmware.

Figure 4B:
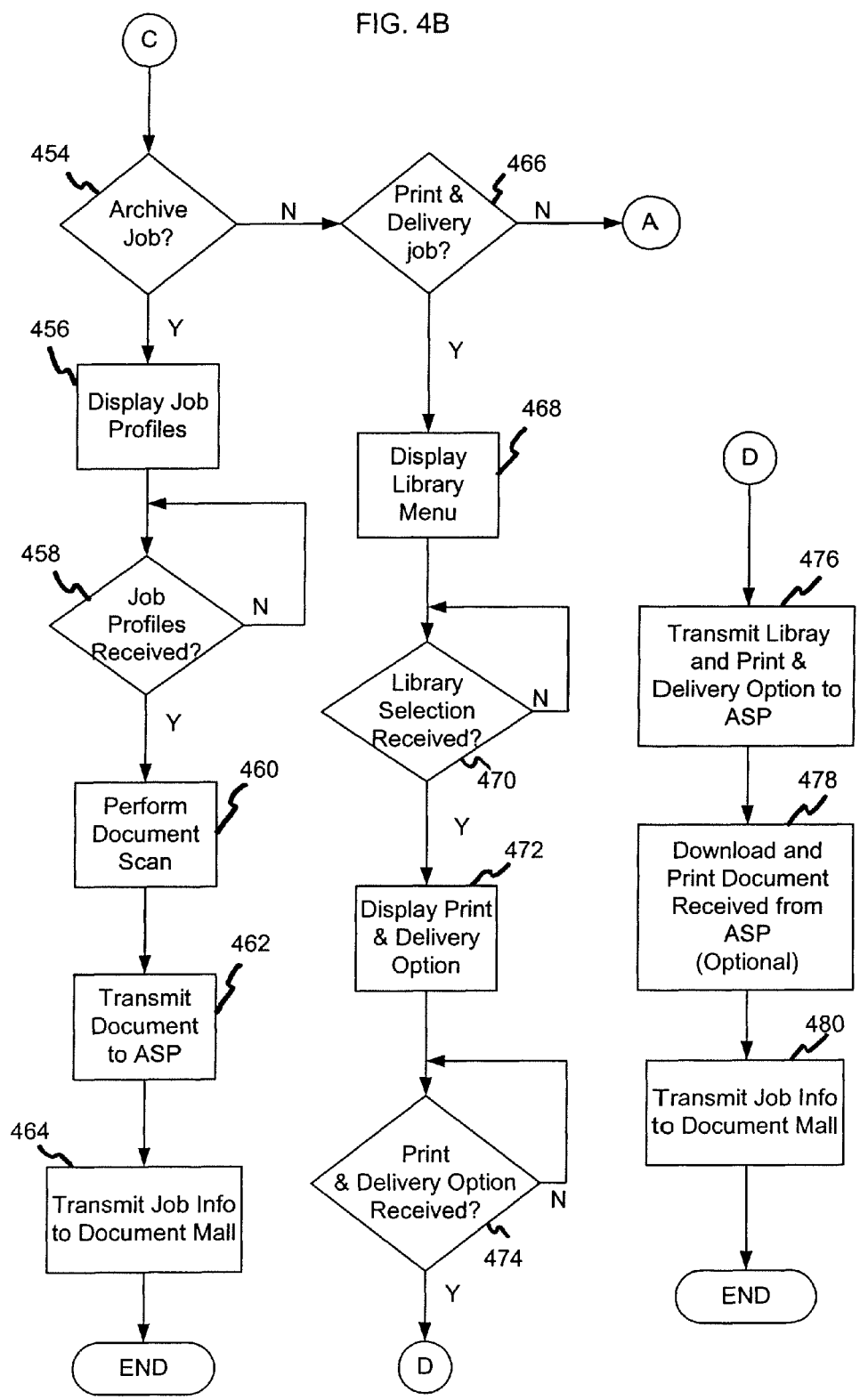
Figure 5:
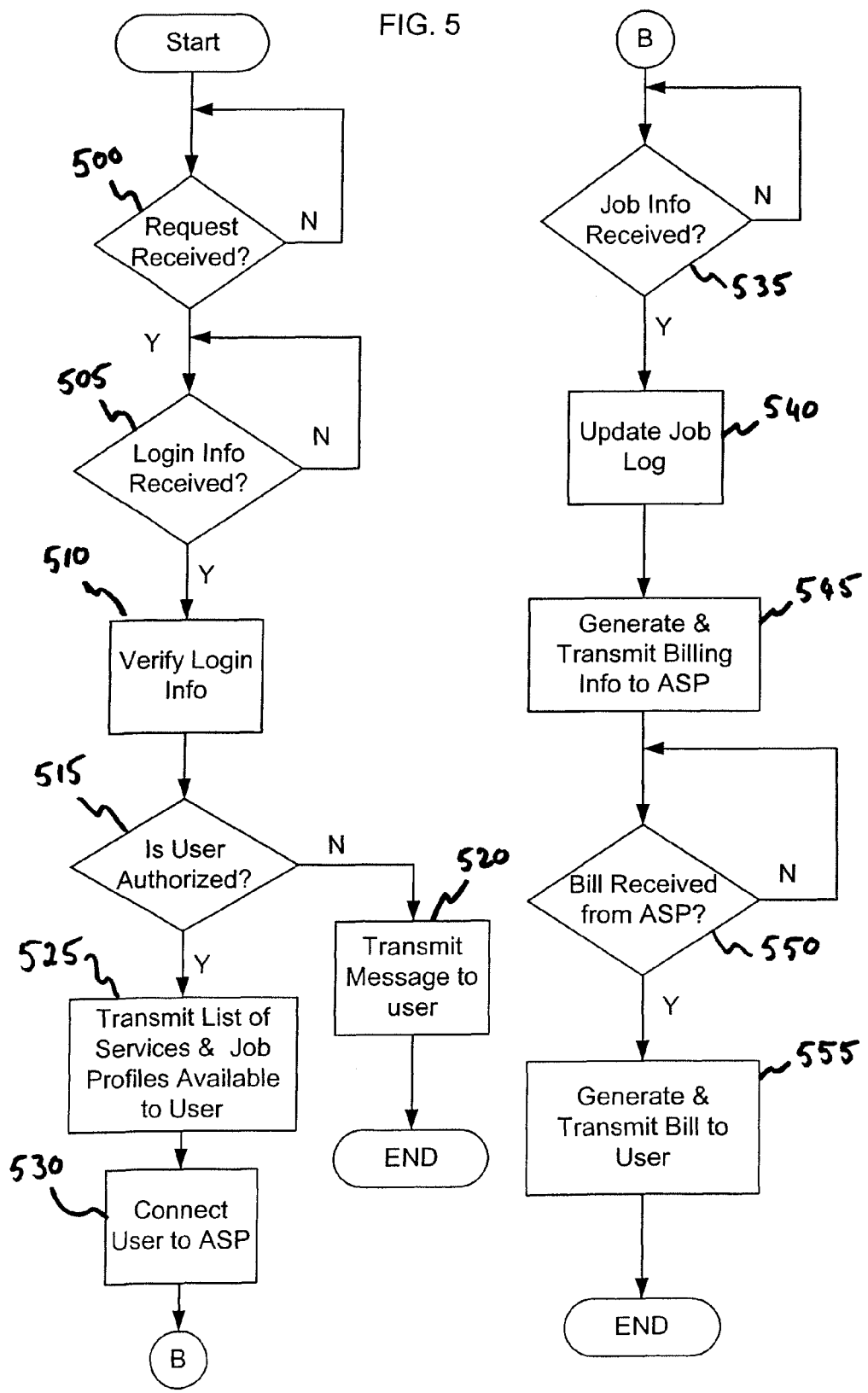
FIG. 5 shows a flowchart of a method of managing documents implemented by a document manager according to one embodiment of the present invention.
Figure 6:
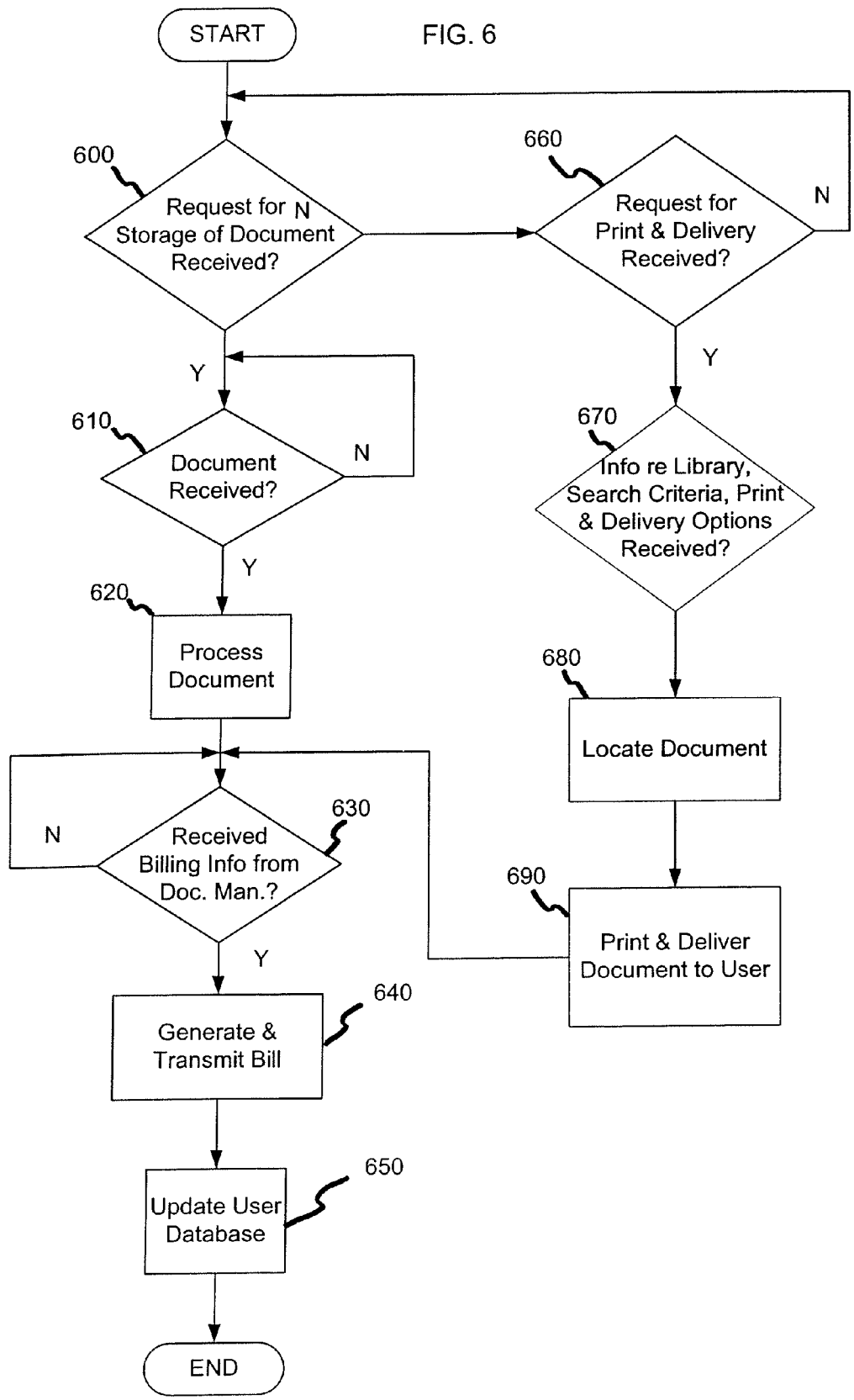
FIG. 6 shows a flowchart of a method of managing documents implemented by an ASP according to one embodiment of the present invention.

FIGS. 4-6 show flowcharts illustrating a method of managing documents according to the present invention. In one embodiment of the present invention, the MFP 90 performs the method illustrated in FIGS. 4A-B. At step 400, the MFP 90 displays a basic screen on its control panel, such as screen 1110 of FIG. 11. If the operator requests at step 405 a "Document Mall" function, i.e., a function provided by the document manager 60, the MFP 90 displays a Document Mall menu at step 415, such as screen 1200 of FIG. 12. Otherwise, the MFP 90 performs non-Document Mall functions at step 410. The Document Mall menu prompts the operator to enter login information, such as a login name, an ID, a password, and/or a desired ASP 10, etc. As noted above, the MFP 90 can also include in the login information the serial number, location, and/or model name of the MFP 90. At step 420, the MFP 90 loops until the login information is received form the operator. At step 425, the MFP 90 transmits the login information to the document manager 60. At step 430, the MFP 90 loops until the services available and job profile lists are received from the document manager 60. At step 435, the MFP 90 displays the services available, for example using screen 1300 of FIG. 13. At step 440, the MFP 90 loops until the operator selects a service. At step 442, the MFP 90 inquires whether the requested service is a document scan job. If the requested service is a document scan job, the MFP 90 displays at step 444 a list of job profiles available for the scanning job, for example using screen 1400 of FIG. 14. At step 446, the MFP 90 loops until the operator selects a job profile. At step 448, the MFP 90 performs the scan job according to the selected job profile. At step 450, the MFP 90 transmits the electronic version of the scanned document to the selected APS 10-40 and/or to the document manager 60. At step 452, the MFP 90 transmits the job information (i.e. the scanning parameters used to scan the document) to the document manager 60.

If the service request received at step 442 is not a scan job, the MFP 90 inquires at step 454 (FIG. 4B) whether the requested service is an archive job. If the requested job is a document archive job, the MFP 90 displays at step 456 the job profiles available for the archive job, for example using screen 1500 of FIG. 15. At step 458, the MFP 90 loops until the operator selects a job profile. At step 460, the MFP 90 performs the scanning of the document to be archived. At step 462, the MFP 90 transmits the electronic version of the scanned document to the selected APS 1040. At step 464, the MFP 90 transmits the job information to the document manager 60.

If the service request received at step 454 is not an archive job, the MFP 90 inquires at step 466 whether the requested service is a Print & Delivery job. If the requested service is not a Print & Delivery job, the MFP 90 can go back to step 435. Alternatively, the MFP 90 can inquire whether other services (not shown) are requested. If the requested service is a Print & Delivery job, the MFP 90 displays at step 468 a library menu, such as screen 1600 of FIG. 16. The MFP 90 can also display subsequent screens (not shown) to permit the user to enter search criteria for a document search by the ASP in the selected library. After receiving the selected library at step 470 (and other information such as the search criteria), the MFP 90 displays at step 472 a Print & Display option menu, such as the screen 1700 of FIG. 17. Once the selected Print & Display option is received at step 474, the MFP 90 can transmit the selected library and Print & Display option to the ASP 10-40 at step 476. If the selected Print & Display option includes downloading and printing a document, the MFP 90 performs that function at step 478. The MFP 90 then transmits the job information to the document manager 60 at step 480.

In one embodiment of the present invention, the document manager 60 performs the method illustrated in FIG. 5. At step 500, the document manager 60 loops until a user 70 requests its services. Once such a request is received, the document manager 60 loops until the login information is received from that user 70 at step 505. Once the login information is received, at step 510 the document manager 60 verifies the login information to determine at step 515 whether the user 70 is authorized to use the document manager 60. If the user 70 is not authorized, at step 520 the document manager 60 transmits a message to the user 70 that he/she is not an authorized user 70. If the user 70 is authorized, the document manager 60 transmits to the user the services and job profiles available to the user at step 525. At step 530, the document manager 60 connects the user 70 to the ASP 10 selected by the user 70. The document manager 60 loops at step 535 until the job information is received form the user 70. As an optional step (not shown), the document manager 60 can loop until the electronic version of the scanned document is received. Once the job information is received, the document manager 60 updates the job log at step 540. At step 545, the document manager 60 generates and transmits the billing information to the selected ASP 10 based on the job information received. Alternatively, the document manager 60 can transmit job information to the selected ASP 10. At step 550, the document manager 60 loops until a bill is received from the ASP 10. Once the bill from the ASP 10 is received, the document manager 60 can generate and transmit a bill to the user 70 at step 555. For example, the document manager 60 can generate a bill at step 555 by incorporating a commission to the bill from the ASP 10 or by unifying several bills into a unified bill. Alternatively, the commission can be added in the billing information at step 545 and step 555 may be a receiving step for an electronic payment from the ASP.

In one embodiment of the present invention, the ASP 10 performs the method illustrated in FIG. 6. At step 600, the ASP 10 inquires whether a document storage request was received from an authorized user. If a document storage request is received, the ASP 10 loops at step 610 until the electronic version of the document is received. At step 620, the ASP 10 processes the document. For example the ASP 10 can convert and/or store the document. At step 630, the ASP 10 loops until the billing information is received from the document manager 60. Once the billing information is received, at step 640 the ASP 10 generates and transmits a bill based on the billing information and on the document processing performed by the ASP. Alternatively, if a bill is received from the document manager 60, the ASP 10 can pay the bill to the document manager at step 640. At step 650, the ASP 10 updates its user database using the billing information and any other information, e.g., the job information, received from the document manager 60 and/or user 70. This information can be used for other purposes, such as marketing or developing new services based on customers' habits and needs.

If a document storage request is not received at step 600, the ASP 10 inquires at step 660 wether a Print and Delivery request was received from an authorized user. If such a request was not received, the ASP 10 loops back to step 600. If a Print and Delivery request was received, the ASP 10 inquires at step 670 whether the information regarding the library, the Print and Delivery options and the search criteria were received. Once that information is received, the ASP 10 locates the document from the appropriate library based on the search criteria at step 680. At step 690, the ASP 10 prints and delivers the located document to the user in accordance with the Print and Delivery options received at step 660. If the Print and Delivery option requested a downloading of the document to the user for printing at the MFP 90, the ASP can download the document to the user at step 690. The ASP can then go to step 630 to complete its cycle.

Figure 7:
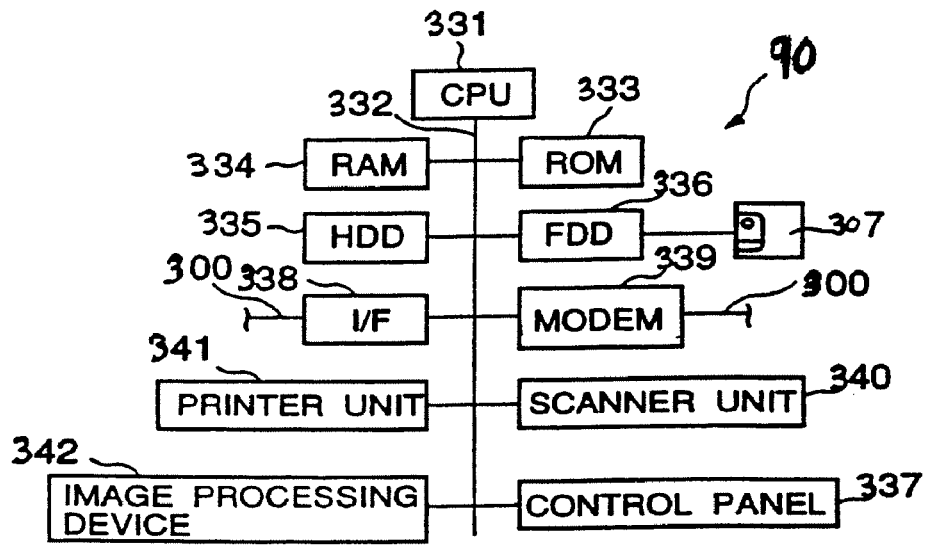
FIG. 7 is a block diagram illustrating an image forming apparatus according to one embodiment of the present invention.
Figure 8:
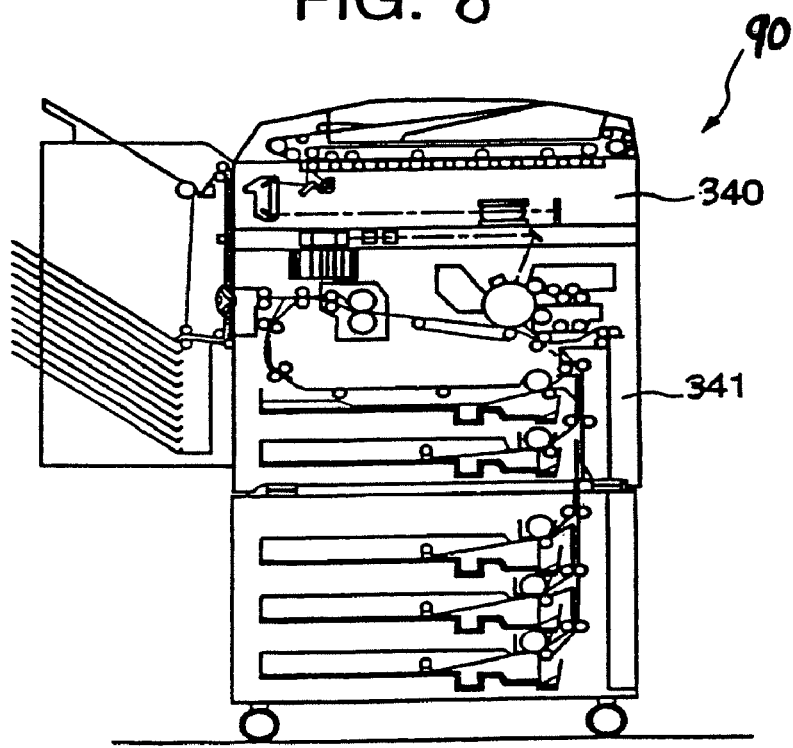
FIG. 8 is a schematic representation of an image forming apparatus according to one embodiment of the present invention.

An example of an image forming apparatus (e.g., MFP 90) according to the present invention is illustrated in FIGS. 7-8, which show a central processing unit (CPU) 331, and various elements connected to the CPU 331 by an internal bus 332. The CPU 331 services multiple tasks while monitoring the state of the MFP 90. The elements connected to the CPU 331 include a read only memory (ROM) 333, a random access memory (RAM) 334, a hard disk drive (HDD) 335, a floppy disk drive (FDD) 336 capable of receiving a floppy disk 307, a communication interface (I/F) 338, and a modem unit 339. In addition, a control panel 337, a scanner unit 340, a printer unit 341, and an image processing device 342 can be connected to the CPU 331 by the bus 332. Both the I/F 338 and the modem unit 339 are connected to a communication network 300, which is further connected to a public telephone line (not shown). MFP 90 can thus be connected to PC 80, or network 55 via the communication network 300. According to one embodiment of the present invention, the MFP 90 can be implemented using the server shown in U.S. Pat. No. 5,928,335, the entire content of which is hereby incorporated by reference.

In a preferred embodiment, program code instructions for the MFP 90 may be stored in the HDD 335 and executed by the CPU 331. These instructions may be information management instructions, such as instructions to prompt the operator of the MFP 90 to enter login information, instructions to transmit the login information to the document manager 60, instructions to display menu screens, instructions to scan a document according to a job profile, instructions to transmit a scan document to the document manager 60 or to an ASP 10, and/or instructions to collect and transmit to the document manager job information. In other words, these instructions can be any of the instructions to perform the method steps described above with corresponding FIGS. 4A-B. These instructions permit the MFP 90 to interact with the document manager 60 and to control the control panel 337 and the image processing units of the MFP 90. These instructions may also be image processing instructions.

Alternatively, the program code instructions may be stored on the floppy 307 and read by the FDD 336 and executed by the CPU 331 to carry out the instructions. Alternatively, the program code instructions may be read from the floppy 307 to the HDD 335. Alternatively, the program code instructions may be loaded to the ROM 333. It is therefore understood that in the present invention any of the HHD 335, the floppy disk 307, the RAM 334, and the ROM 333 correspond to a computer readable storage medium capable of storing program code instructions. Other devices and medium that can store the instructions according to the present invention include for example magnetic disks, optical disks including DVDs, magneto-optical disks such as MOS, and semiconductor memory cards such as PC cards.

In a preferred embodiment, the control panel 337 includes a display screen that displays menus allowing the operator of the MFP 90 to interact with the document manager 60. The display screen 142 may be a liquid crystal display (LCD), a plasma display device, or a cathode ray tube (CRT) display. The display screen 142 does not have to be integral with, or embedded in, the control panel 337, but may simply be coupled to the control panel 337 by either a wire or a wireless connection. The control panel 337 may include keys for inputting information or requesting various operations. Alternatively, the control panel 337 and the display screen 142 may be operated by a keyboard, a mouse, a remote control, touching the display screen 142, voice recognition, or eye-movement tracking, or a combination thereof.

Figure 9:
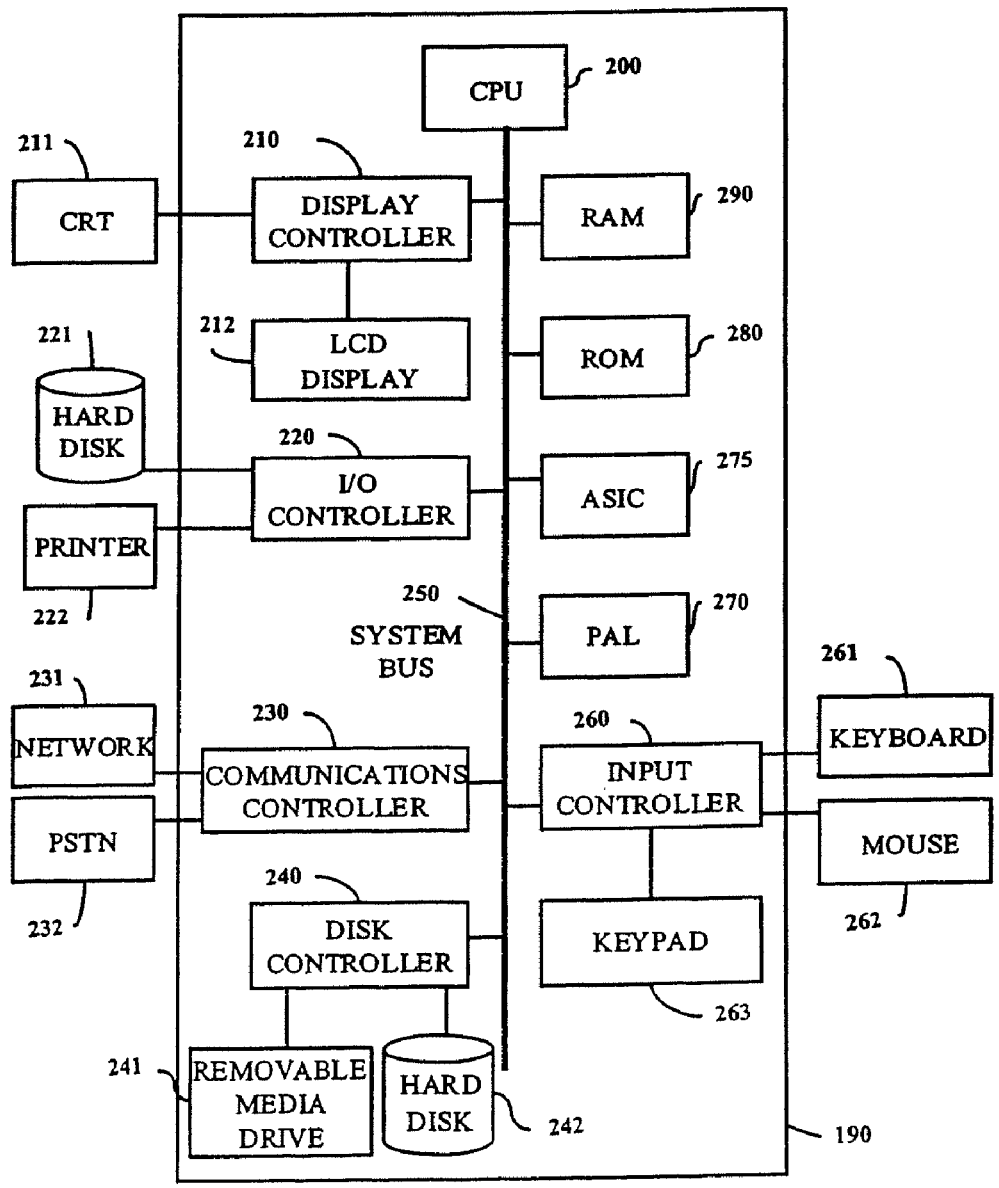
FIG. 9 is block diagram illustrating a device capable of implementing the document manager according to the present invention.
Figure 10:
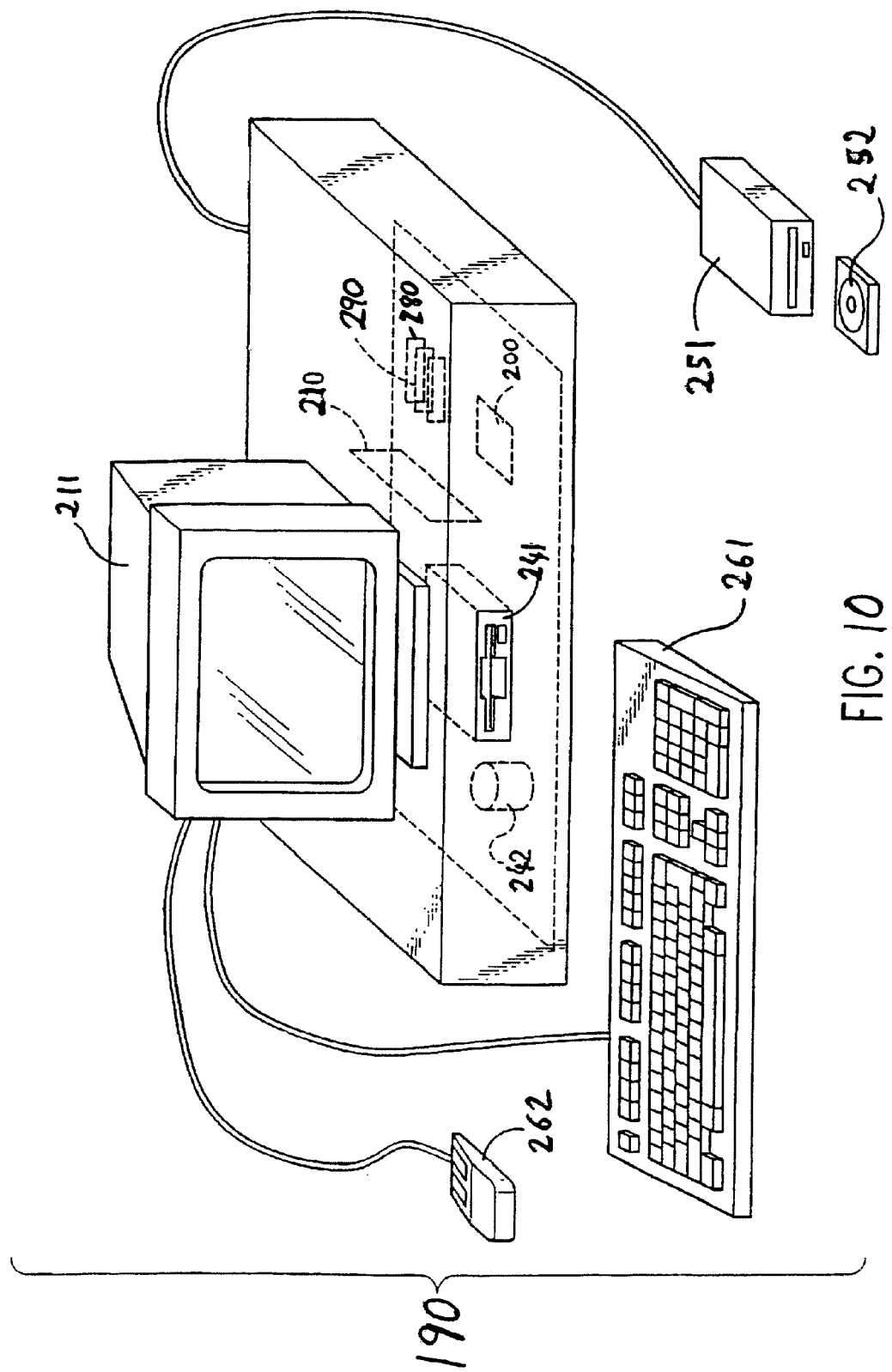
FIG. 10 is schematic representation of a device capable of implementing the document manager according to the present invention.

FIG. 9 is a block diagram of a device 190 that can be used as the document manager 60 shown in FIG. 1-3 and can implement the method shown in FIG. 5. FIG. 10 is a schematic representation of device 190. The device 190 includes a central processing unit 200 (CPU) that communicates with a number of other devices by way of a system bus 250. The device 190 includes a random access memory (RAM) 290 that hosts temporary storage values used in implementing the document managing functions of the document manager, such as verifying login information, generating and transmitting job profiles, connecting users to ASPs, managing job information, generating and transmitting billing information, etc.

A conventional personal computer or computer workstation with sufficient memory and processing capability may also be configured to operate as device 190. In one embodiment, device 190 operates as the document manager 60, both receiving and transmitting information by users 70-76 and ASPs 10-40. Central processing unit 200 is configured for high volume data transmission and performing a significant number of mathematical calculations in processing communications and database searches. A Pentium III microprocessor such as the 1 GHz Pentium III manufactured by Intel Inc. may be used for CPU 100. Other suitable processors include the Motorola 500 MHZ PowerPC G4 processor and the Advanced Micro Devices 1 GHz AMD Athlon processor. Multiple processors or workstations may be used as well.

The ROM 280 is preferably included in a semiconductor form although other read-only memory forms including optical media may be used to host application software and temporary results. The ROM 280 connects to the system bus 250 for use by the CPU 200. The ROM 280 includes computer readable instructions that, when executed by the CPU 200, perform the different functions discussed above associated with billing for document management services. An input controller 260 connects to the system bus 250 and provides an interface with various peripheral equipment including a keyboard 261 and a pointing device such as a mouse 262. The input controller 260 may include different ports such as a mouse port in the form of a PS2 port or, for example, a universal serial bus (USB) port. The keyboard port for the input controller 260 is in the form of a mini-DIN port although other connectors may be used as well. The input controller 260 provides sound card connections so that external jacks on the sound card allow users to attach microphone speakers or an external sound source. The input controller 260 also may include serial ports or parallel ports as well.

A disk controller 240 is in the form of an IDE controller and connects via ribbon cables to a floppy disk drive 241 as well as a hard disk drive 242, a CD-ROM drive 251 and a compact disk 252 (FIG. 9). In addition, a PCI expansion slot is provided on the disk controller 240 or mother board that hosts the CPU 200. An enhanced graphic port expansion slot is provided and provides 3-D graphics with fast access to the main memory. The hard disk 242 may also include a CD-ROM that may be readable as well as writeable. A communication controller 230 provides a connection, for example by way of an Ethernet connection to a network 231. The network may be a connection to the public switch telephone network (PSTN) 232 for providing Internet access, or a local area network, wide area networks, a virtual private network (VPN), an extranet. In one embodiment, the network 231 and the connection to the communication controller 230 are made by way of a plurality of connections including a cable-modem connection, DSL connection, dial-up modem connection, and the like that connect to the communication controller 230.

An input/output controller 220 also provides connections to external components such as an external hard disk 221, printer 222, for example, by way of an RS 232 port and a SCSI bus. For more information on how the input/output devices operate according to the present invention, such devices are described in part 5 of "How Computers Work", by Ron White, Que Corporation, pps. 184-276, September, 1999, ISBN: 0-7897-2112-0, the entire content of which is hereby incorporated by reference. A display controller 210 interconnects the system bus 250 to a display device, such as a cathode ray tube (CRT) 211. While a CRT is shown, a variety of other display devices may be used such as an LCD (liquid crystal display), or plasma display device.

The mechanisms and processes set forth in the present description may be implemented using a conventional general purpose microprocessor(s) or digital computer programmed according to the teachings of the present specification, as will be appreciated to those skilled in the relevant arts. Appropriate software coding can readily be prepared by skilled programmers based on the teachings of the present disclosure, as will also be apparent to those skilled in the relevant arts. In particular, the computer program product for managing ASP documents according to the present invention can be written in a number of computer languages including but not limited to C, C++, Fortran, and Basic, as would be recognized by those of ordinary skill in the art. The invention may also be implemented by the preparation of applications specific integrated circuits or by interconnecting an appropriate network of conventional component circuits, as will be readily apparent to those skilled in the art.

The present invention thus also includes a computer-based product that may be hosted on a storage medium and include instructions that can be used to program a computer to perform a process in accordance with the present invention. This storage medium can include, but is not limited to, any type of disk including floppy disks, optical disks, CD-ROM, magneto-optical disks, ROMs, RAMs, EPROMs, EEPROMs, Flash Memory, Magnetic or Optical Cards, or any type of media suitable for storing electronic instructions.

Obviously, numerous additional modifications and variations of the present invention are possible in light of the above teachings. It is therefore to be understood that within the scope of the appended claims the present invention may be practiced otherwise than as specifically described herein.

What is claimed:

1. A method performed by an information processing apparatus for managing documents, comprising:
   receiving, by a communication interface of the information processing apparatus from an image processing device, login information via a network;
   retrieving, by a processor of the information processing apparatus, a plurality of job profiles specific to the received login information, the job profiles each identifying an image processing operation available at the image processing device and indicating a plurality of default settings for the image processing operation; and
   transmitting, by the communication interface of the information processing apparatus, the job profiles to the image processing device to be displayed.

2. The method of claim 1, further comprising:
   receiving, from the image processing device, a selection of a job profile based on the displayed job profiles.

3. The method of claim 1, wherein:
   the plurality of default settings for the image processing operation includes at least one of a destination folder, scan resolution, color, compression method, image density, document source, paper size, scan mode and media type.

4. The method of claim 1, further comprising:
   editing, by the processor of the information processing apparatus, at least one of the of job profiles specific to the received login information by receiving setting information from the image processing device.

5. The method of claim 1, further comprising:
   retrieving, by the communication interface of the information processing apparatus, a list of available application service providers corresponding to the received login information.

6. The method of claim 1, wherein:
   the login information includes at least one of a username, password, identification number, account information, serial number of the image processing device, location of the image processing device and model name of the image processing device.

7. The method of claim 1, further comprising:
   verifying, by the processor of the information processing apparatus, that a user is authorized to access the image processing device by comparing the received login information to stored authentication data.

8. The method of claim 1, further comprising:
   retrieving, by the communication interface of the information processing apparatus, a user profile corresponding to the received login information.

9. The method of claim 8, wherein:
   the user profile includes the job profiles specific to the received login information.

10. An information processing apparatus for managing documents, comprising:
    a communications interface configured to receive login information from an image processing device via a network;
    a first module configured to retrieve a plurality of job profiles specific to the received login information, the job profiles each identifying an image processing operation available at the image processing device and indicating a plurality of default settings for the image processing operation; and
    the communications interface configured to transmit the job profiles to the image processing device to be displayed.

11. The apparatus of claim 10, wherein the communications interface is configured to receive, from the image processing device, a selection of a job profile based on the displayed job profiles.

12. The apparatus of claim 10, wherein:
    the plurality of default settings for the image processing operation includes at least one of a destination folder, scan resolution, color, compression method, image density, document source, paper size, scan mode and media type.

13. The apparatus of claim 10, further comprising:
    a second module configured to retrieve a list of available application service providers corresponding to the received login information.

14. The apparatus of claim 10, wherein:
    the login information includes at least one of a username, password, identification number, account information, serial number of the image processing device, location of the image processing device and model name of the image processing device.

15. The apparatus of claim 10, further comprising:
a second module configured to verify that a user is authorized to access the image processing device by comparing the received login information to stored authentication data.

16. The apparatus of claim 10, further comprising:
a second module configured to retrieve a user profile corresponding to the received login information.

17. The apparatus of claim 16, wherein:
the user profile includes information indicating the plurality of job profiles specific to the received login information.

18. An information processing device for managing documents, comprising:
means for receiving login information from an image processing device via a network;
means for retrieving a plurality of job profiles specific to the received login information, the job profiles each identifying an image processing operation available at the image processing device and indicating a plurality of default settings for the image processing operation; and
means for transmitting the job profiles to the image processing device to be displayed.

19. A method for managing documents at an image processing device, comprising:
transmitting login information to a computer remote from the image processing device via a network;
receiving a plurality of job profiles specific to the login information, the job profiles each identifying an image processing operation available at the image processing device and indicating a plurality of default settings for the image processing operation;
displaying the plurality of job profiles; and
setting a default setting at the image processing device in accordance with a selected one of the plurality of job profiles.

20. The method of claim 19, further comprising:
selecting a first job profile from the plurality of job profiles.

21. The method of claim 19, wherein setting a default setting comprises setting at least one of a destination folder, scan resolution, color, compression method, image density, document source, paper size, scan mode and media type.

22. The method of claim 19, further comprising:
receiving, at an interface of the image processing device, the login information from a user.

23. The method of claim 19, wherein:
the login information includes at least one of a username, password, identification number, account information, serial number of the image processing device, location of the image processing device and model name of the image processing device.

24. An image processing device, comprising:
a communications interface configured to transmit login information to a computer remote from the image processing device via a network;
the communications interface configured to receive a plurality of job profiles specific to the login information, the job profiles each identifying an image processing operation available at the image processing device and indicating a plurality of default settings for the image processing operation;
a display configured to display the plurality of job profiles; and
a first module configured to set a default setting at the image processing device in accordance with a selected one of the plurality of job profiles.

25. The device of claim 24, further comprising:
an interface configured to allow a user to select a first job profile from the plurality of job profiles.

26. The device of claim 24, wherein the first module is configured to set at least one of a destination folder, scan resolution, color, compression method, image density, document source, paper size, scan mode and media type.

27. The device of claim 24, further comprising
a user interface configured to receive the login information from a user.

28. The device of claim 24, wherein:
the login information includes at least one of a username, password, identification number, account information, serial number of the image processing device, location of the image processing device and model name of the image processing device.

29. An image processing device, comprising
means for transmitting login information to a computer remote from the image processing device via a network;
means for receiving a plurality of job profiles specific to the received login information, the job profiles each identifying an image processing operation available at the image processing device and indicating a plurality of default settings for the image processing operation;
means for displaying the plurality of job profiles; and
means for setting a default setting at the image processing device in accordance with a selected one of the plurality of job profiles.

* * * * *